United States Patent
Wang et al.

(10) Patent No.: US 8,681,835 B2
(45) Date of Patent: Mar. 25, 2014

(54) MULTI-STAGE TURBO EQUALIZATION AND INTERFERENCE CANCELLATION RECEIVER FOR WIRELESS SYSTEMS

(75) Inventors: Yi-Pin Eric Wang, Fremont, CA (US); Stephen Grant, Pleasanton, CA (US); Ning He, Sollentuna (SE); Niklas Johansson, Uppsala (SE); Michael Samuel Bebawy, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 13/402,297

(22) Filed: Feb. 22, 2012

(65) Prior Publication Data

US 2013/0077720 A1 Mar. 28, 2013

Related U.S. Application Data

(60) Provisional application No. 61/540,144, filed on Sep. 28, 2011.

(51) Int. Cl.
*H04B 1/00* (2006.01)

(52) U.S. Cl.
USPC .......................................... 375/148; 375/130

(58) Field of Classification Search
USPC ................. 375/148, 150, 233, 340, 341, 316; 714/752
See application file for complete search history.

(56) References Cited

U.S. PATENT DOCUMENTS

| | | | |
|---|---|---|---|
| 6,363,103 B1 | 3/2002 | Buehrer et al. | |
| 6,667,964 B1 | 12/2003 | Seki et al. | |
| 6,683,924 B1 | 1/2004 | Ottosson et al. | |
| 6,922,434 B2 | 7/2005 | Wang et al. | |
| 2001/0028677 A1 | 10/2001 | Wang et al. | |
| 2005/0195889 A1 | 9/2005 | Grant et al. | |
| 2005/0201447 A1 | 9/2005 | Cairns et al. | |
| 2005/0249269 A1 | 11/2005 | Tomasin et al. | |
| 2006/0251156 A1 | 11/2006 | Grant et al. | |
| 2006/0268962 A1 | 11/2006 | Cairns et al. | |
| 2007/0147329 A1 | 6/2007 | Soriaga et al. | |
| 2007/0147481 A1 | 6/2007 | Bottomley et al. | |
| 2008/0063033 A1 | 3/2008 | Khayrallah | |

(Continued)

FOREIGN PATENT DOCUMENTS

| | | |
|---|---|---|
| EP | 1233565 A2 | 8/2002 |
| EP | 1259001 A1 | 11/2002 |

(Continued)

OTHER PUBLICATIONS

International Search Report and Written Opinion in International Application No. PCT/SE2012/050638 dated Apr. 23, 2013 (17 pages total).

(Continued)

*Primary Examiner* — Khai Tran
(74) *Attorney, Agent, or Firm* — Nixon & Vanderhye, P.C.

(57) ABSTRACT

In a receive node of a wireless network, an iterative multi-user multi-stage interference cancellation receiver is used. The receiver performs code-averaged equalization and chip chip-level code-specific interference over-cancellation on the received signals. This can result in a unified interference cancellation processing, and can avoid cumbersome calculations of code cross correlations that is required in symbol-level interference cancellation. A symbol-level code-averaged desired signal add-back is performed to address the over-cancellation of some desired signals.

35 Claims, 18 Drawing Sheets

(56) References Cited

U.S. PATENT DOCUMENTS

| | | | |
|---|---|---|---|
| 2008/0130719 A1 | 6/2008 | Bottomley et al. | |
| 2008/0304554 A1 | 12/2008 | Fulghum et al. | |
| 2009/0186645 A1* | 7/2009 | Jaturong et al. | 455/507 |
| 2009/0257477 A1 | 10/2009 | Khayrallah et al. | |
| 2011/0222618 A1 | 9/2011 | Huss et al. | |

FOREIGN PATENT DOCUMENTS

| | | | |
|---|---|---|---|
| WO | 02080432 A2 | 10/2002 |
| WO | 2006-030314 A1 | 3/2006 |
| WO | 2007-051111 A1 | 5/2007 |

OTHER PUBLICATIONS

Kim-Chyan Gan, "Maximum Ratio Combining for a WCDMA Rake Receiver", Freescale Semiconductor Application Note, Rev. 2, Nov. 2004 (8 pages total).

International Search Report and Written Opinion in International Application No. PCT/SE2012/051032 dated Apr. 26, 2013 (17 pages total).

R1-090919, TSG-RAN WG1 #56, "Performance prediction of turbo-SIC receivers for system-level simulations", Orange, Nokia, Nokia Siemens Networks, Texas Instruments, Athens, Greece, Feb. 9-13, 2009 (11 pages).

C. Laot et al., "Low-Complexity MMSE Turbo Equalization: A Possible Solution for EDGE," IEEE Trans. Wireless Commun., vol. 4, No. 3, pp. 1-30, May 2005.

Gilberto Berardinelli et al., "Improving SC-FDMA Performance by Turbo Equalization in UTRA LTE Uplink", in Proc. IEEE Veh. Technol. Conf. (VTC), Singapore, pp. 2557-2561, May 2008.

Gilberto Berardinelli et al., "Turbo Receivers for Single User MIMO LTE-A Uplink," in Proc. IEEE Veh. Technol. Conf. (VTC), Barcelona, Spain, pp. 26-29, Apr. 2009.

Chester S. Park et al., "Evolution of Uplink MIMO for LTE-Advanced," IEEE Commun. Magazine, vol. 49, No. 2, pp. 112-121, Feb. 2011.

Office Action dated Oct. 9, 2013 in related U.S. Appl. No. 13/333,703 (12 pages).

International Search Report and Written Opinion mailed Sep. 9, 2013 in corresponding International Application No. PCT/SE2012/050920 (15 pages total).

Office Action dated Sep. 17, 2013 in related U.S. Appl. No. 13/333,478 (10 pages).

* cited by examiner

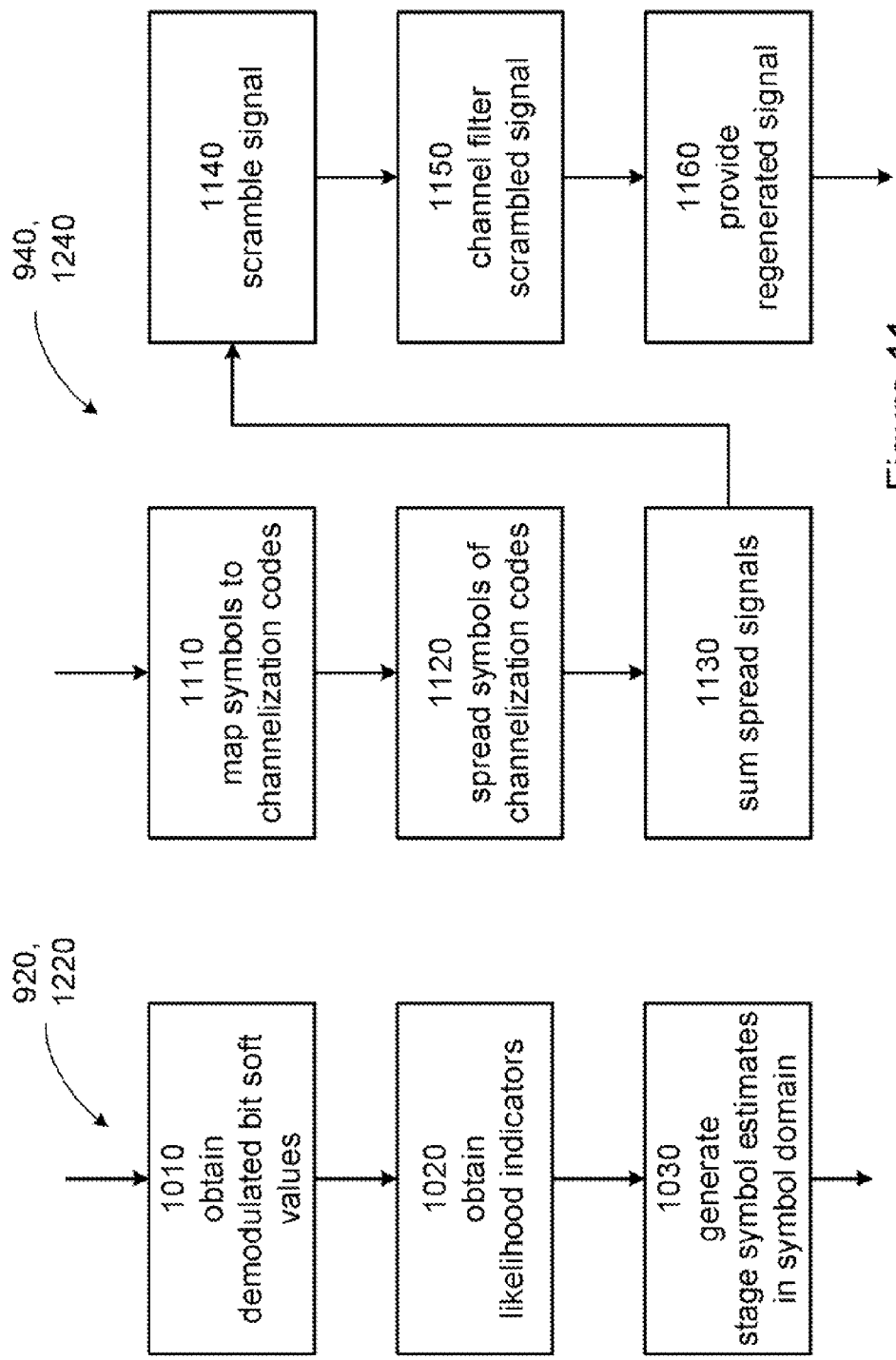

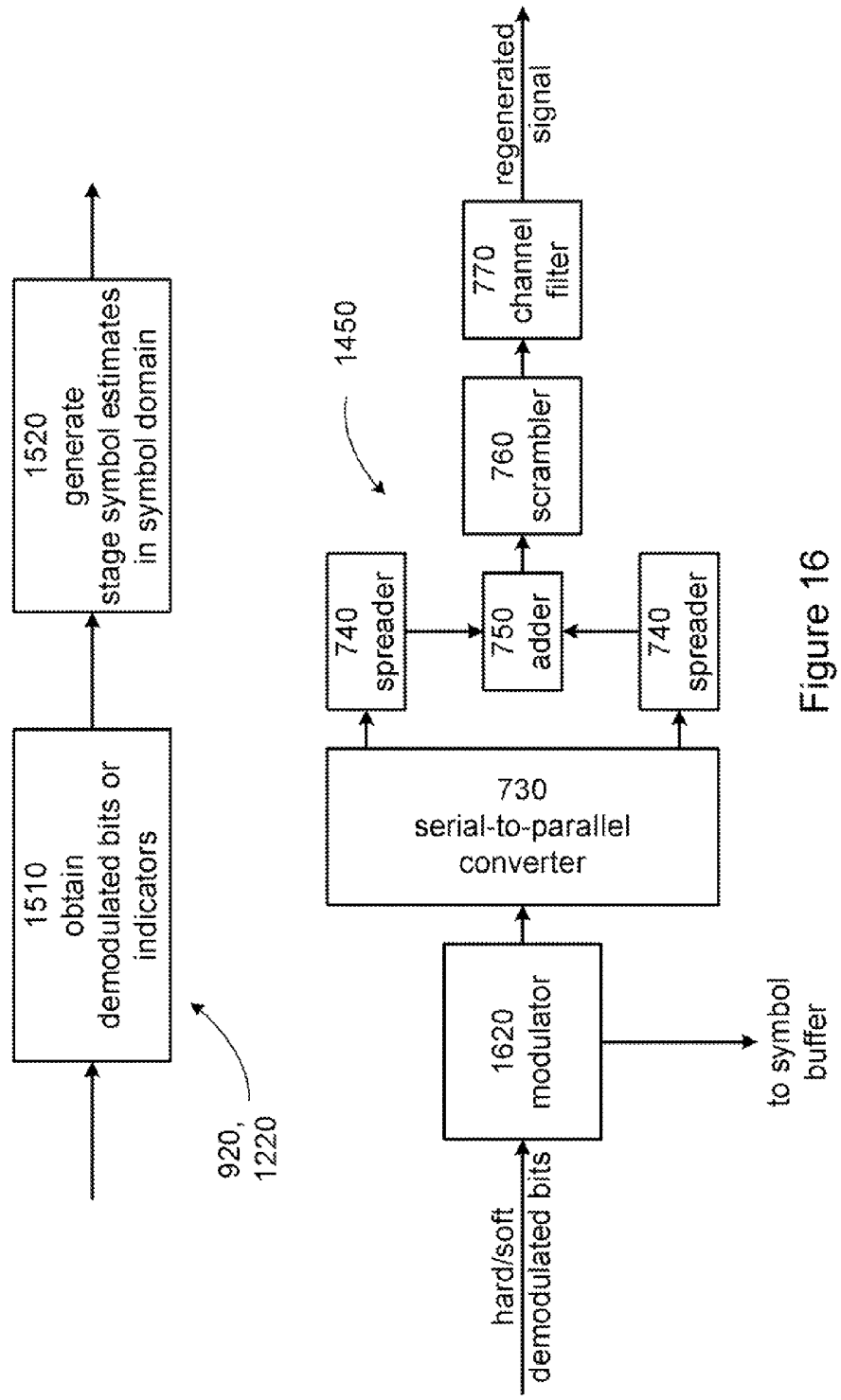

MULTI-STAGE TURBO EQUALIZATION AND INTERFERENCE CANCELLATION RECEIVER FOR WIRELESS SYSTEMS

RELATED APPLICATIONS

This application may be related, at least in part, to U.S. patent application Ser. No. 13/333,703 entitled "FINGER PLACEMENT IN MULTI-STAGE INTERFERENCE CANCELLATION" filed Dec. 21, 2011, and may be related, at least in part, to U.S. patent application Ser. No. 13/333,478 entitled "IMPAIRMENT COVARIANCE AND COMBINING WEIGHT UPDATES DURING ITERATIVE TURBO INTERFERENCE CANCELLATION RECEPTION" filed Dec. 21, 2011, both of which are incorporated herein by reference in their entirety. This application also claims priority and benefit of U.S. provisional application 61/540,144 entitled "MULTI-STATE TURBO EQUALIZATION AND INTERFERENCE CANCELLATION RECEIVER FOR WIRELESS SYSTEMS" filed on Sep. 28, 2011, which is incorporated herein by reference in its entirety.

TECHNICAL FIELD

The technical field of the present disclosure generally relates to multi-stage turbo equalization and interference cancellation receiver for wireless systems. In particular, the technical field relates to apparatus(es), method(s), and/or system(s) for efficiently equalizing signals through iterative processing.

BACKGROUND

Turbo equalization has typically been used in EDGE and LTE uplink to address inter-symbol interference (ISI) problem caused by channel dispersion. The solution has also been extended to multiple-input-multiple-output (MIMO) reception to address spatial-multiplexing interference in addition to ISI.

In a turbo interference cancellation receiver, interference such as inter-symbol-interference (ISI), code-division multiplexing (CDM) interference, and spatial-multiplexing interference due to single-user (SU) or multi-user (MU) MIMO can be cancelled based on soft estimates of the interfering symbols. The soft symbol estimates are formed using the decoder outputs, which describe the likelihood ratios of the bits that are used to determine these interfering symbols. Each likelihood ratio can be converted to a bit probability (i.e., probability of bit having value 0 or 1). After cancellation, the received signal is re-equalized using new combining weights, which reflect a new impairment covariance matrix due to interference cancellation. The equalized symbols are demodulated and converted to bit soft values, which are used by the various decoders, one for each user or MIMO stream, to produce updated bit likelihood ratios. Such an iterative multi-stage turbo equalization and interference cancellation receiver is referred to as a turbo-IC receiver.

All or almost all of the turbo-IC solutions developed in the prior art are intended for a time-division multiple-access (TDMA) system, e.g., EDGE, or a single-carrier frequency-division multiple-access (SC-FDMA) system, e.g., the LTE uplink. In a code-division multiple-access (CDMA) system, there are two issues. First, commercial CDMA systems such as IS-95, cdma2000, EV-DO, WCDMA, and HSPA all use symbol-dependent spreading waveforms. The spreading waveform of a symbol of interest is determined by a channelization code (e.g., orthogonal variable spreading factor (OVSF) code) and a pseudo-random scrambling code. Since the pseudo-random scrambling code has a period that is much longer than the symbol duration, the effective spreading waveform varies from symbol to symbol.

Thus, in a design of a turbo-IC receiver for a CDMA system, there is an issue of whether a code-specific design or a code-averaged design should be used. In the code-specific design, the time-varying aspects of the spreading waveform are accounted for. But in the code-averaged design, only the code statistics, averaged over a number of symbol intervals, are used in the design. Such a design choice can be made with regard to equalization weights (chip-level or symbol-level, explained further below), interference cancellation, etc.

Another issue with the CDMA system is that the receiver processing for a CDMA signal can happen in the chip domain, i.e., before despreading, or in the symbol domain, i.e., after despreading. For example, equalization can be applied in the chip domain such as in a chip equalization receiver, or in the symbol domain such as in a generalized Rake (G-Rake) receiver.

SUMMARY

A non-limiting aspect of the disclosed subject matter is directed to a method performed in a receive node of a communication network to perform a first stage processing of a symbol of interest contained in a first composite signal, and to perform a second stage processing of the same symbol of interest contained in a second composite signal. The first and second composite signals are both signals in a chip domain. The first stage processing comprises first stage despreading and combining the first composite signal in the chip domain to obtain first stage equalized symbols in the symbol domain, first stage generating first stage symbol estimates in the symbol domain based on the first stage equalized symbols, first stage regenerating a first stage signal estimate in the chip domain based on the first stage symbol estimates, and first stage interference canceling the first stage signal estimate from the first composite signal in the chip domain to generate an interference reduced version of the first composite signal. The second stage processing comprises: second stage despreading and combining the second composite signal in the chip domain to obtain second stage symbol values in the symbol domain, second stage symbol adding-back a scaled version of previous stage symbol estimates to the second stage symbol values to obtain second stage equalized symbols in the symbol domain, and second stage generating second stage symbol estimates in the symbol domain based on the second stage equalized symbols. The second composite signal is based on the interference-reduced version of the first composite signal, and the previous stage symbol estimates are the first stage symbol estimates or the second stage symbol estimates obtained in the step of second stage generating in a previous run of the second stage processing.

Another non-limiting aspect of the disclosed subject matter is directed to a receiver of a receive node of a communication network. The receiver comprises a plurality of chains, in which each chain is structured to process a symbol of interest contained in a first composite signal in a first stage, and to process the same symbol of interest contained in a second composite signal in a second stage. The first and second composite signals are chip domain signals. Each chain of the receiver comprises an equalizer, a demodulator, a signal regenerator, and an interference canceller. In the first stage, the equalizer is structured to first stage despread and combine the first composite signal in the chip domain to obtain first stage equalized symbols in a symbol domain, the demodulator and the signal regenerator are structured to first stage generate first stage symbol estimates in the symbol domain based on the first stage equalized symbols, the signal regenerator is structured to first stage regenerate a first stage signal estimate in the chip domain based on the first stage symbol estimates, and the interference canceller is structured to first stage interference cancel the first stage signal estimate from the first composite signal in the chip domain to generate an interference reduced version of the first composite signal. In the second stage, the equalizer is structured second stage despread and combine the second composite signal in the chip domain to obtain second stage symbol values in the symbol domain, and to perform a second stage symbol add-back a scaled version of previous stage symbol estimates to the second stage symbol values to obtain second stage equalized symbols in the symbol domain. The demodulator and the signal regenerator are structured to second stage generate second stage symbol estimates in the symbol domain based on the second stage equalized symbols. The second composite signal is based on the interference-reduced version of the first composite signal, and the previous stage symbol estimates are the first stage symbol estimates or the second stage symbol estimates obtained in a previous run of the second stage.

Yet another non-limiting aspect of the disclosed subject matter is directed to a non-transitory computer storage medium which has stored therein programming instructions. When a computer executes the programming instructions, the computer executes a method to adaptively . . .

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIG. 10 illustrates a flow chart of an example process to generate current stage symbol estimates in a symbol domain;

FIG. 11 illustrates a flow chart of an example process to regenerate a current stage signal estimate in a chip domain;

FIG. 15 illustrates a flow chart of another example process to generate current stage symbol estimates in a symbol domain;

FIG. 16 illustrates another example embodiment of a signal regenerator;

DETAILED DESCRIPTION

Figure 1:
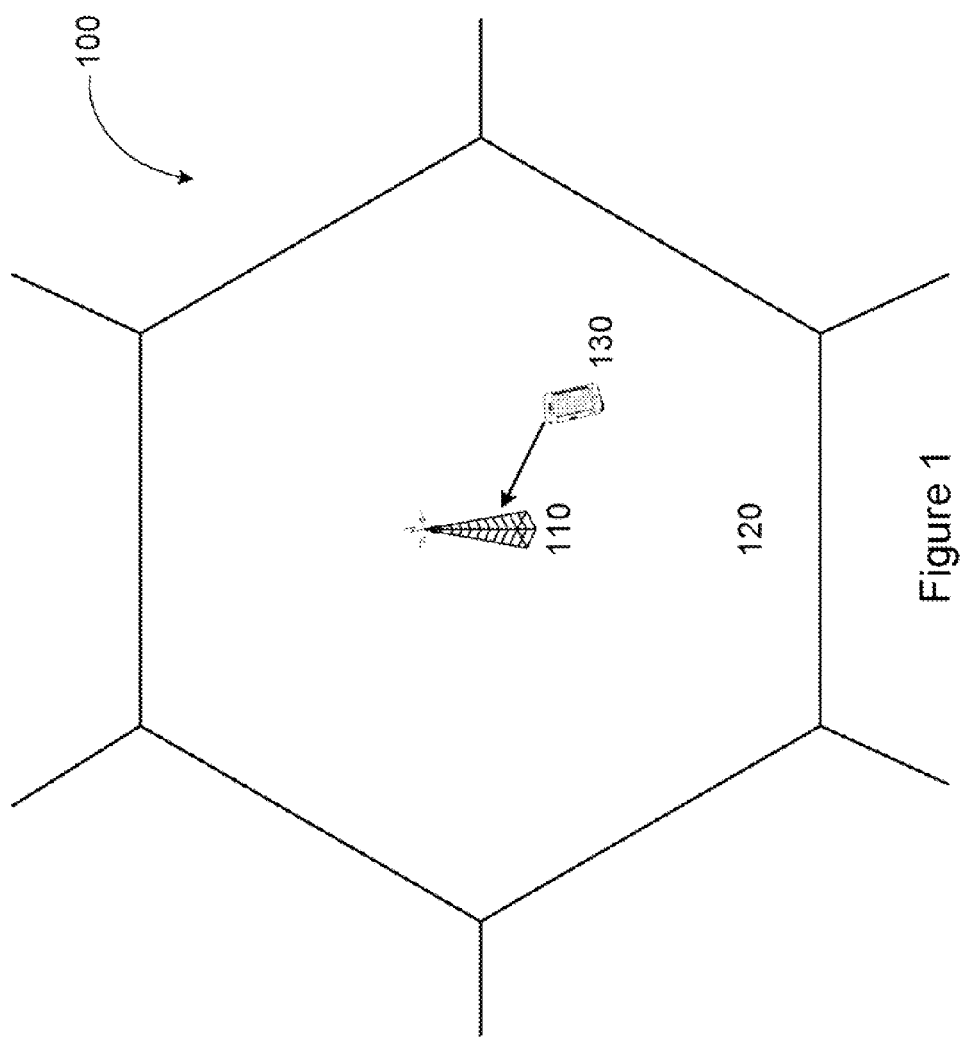
FIG. 1 illustrates an example scenario of a wireless network in which mobile terminals and base station communicate with each other.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, HSPA—are used as examples for explanation purposes. Note that the technology described herein can be applied to non-3GPP standards, e.g., IS-95, cdma2000, 1×EVDO, etc. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

FIG. 1 illustrates an example scenario of a wireless network 100 in which a mobile terminal 130 and a base station 110 (corresponding to cell 120) communicate with each other. In the downlink, the base station 110 is a transmit node and the mobile terminal 130 is a receive node. In uplink, the situation is reversed. For simplicity, one mobile terminal 130 and one base station 110 are shown. However, this should not be taken to be limiting. The concepts discussed can be expanded and applied to networks with multiple base stations and mobile terminals.

Figure 2:
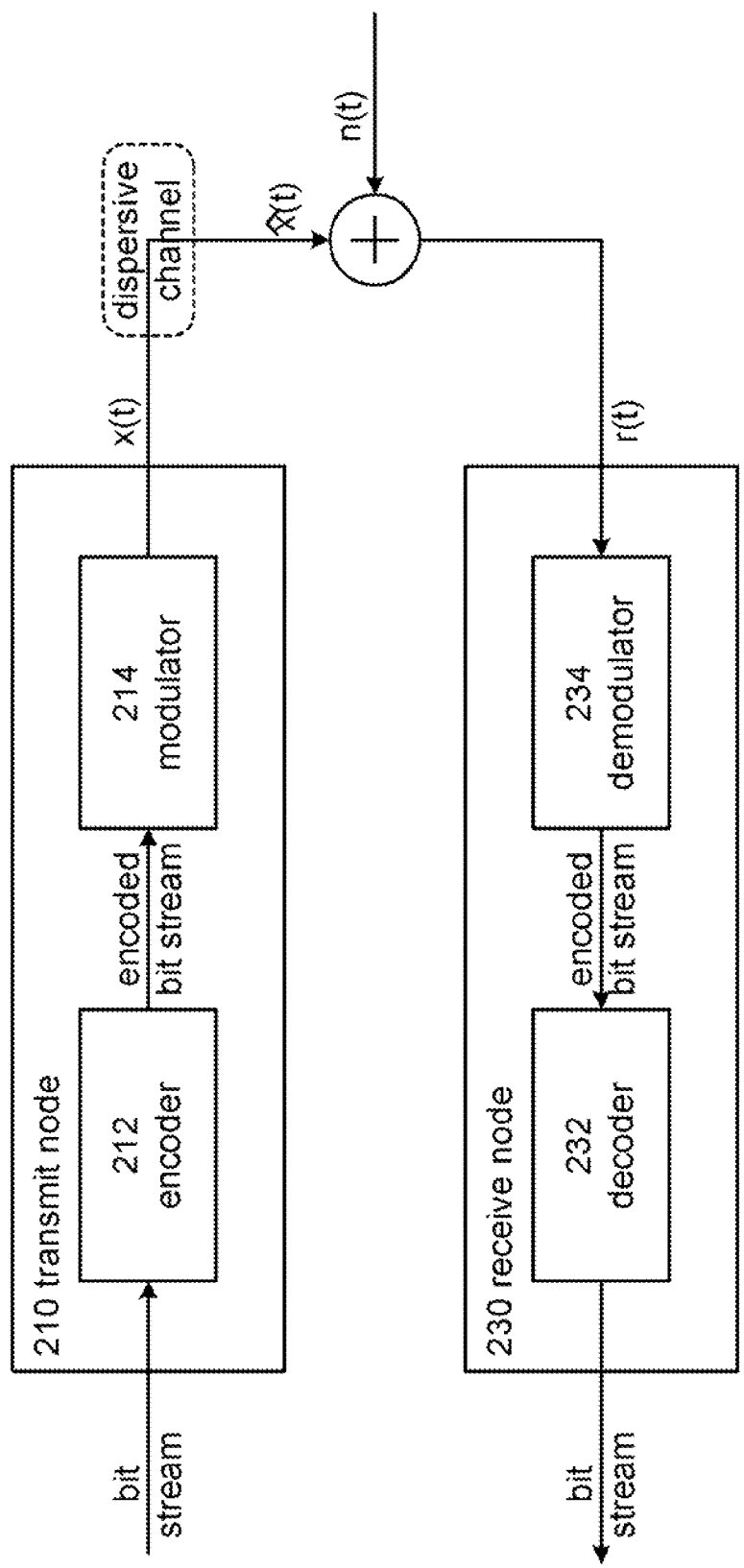
FIG. 2 illustrates a simplified block diagram of a communication link between a transmit node and a receive node.

FIG. 2 is a simplified block diagram of a communication link between a transmit node 210 and a receive node 230. The transmit node 210 performs operations on the data stream, which can be a stream of bits, to transmit a corresponding signal x through a channel 220. While it is recognized that the signal x transmitted from the transmit node 210 is carried by RF carriers, for the purposes of this discussion, equivalent baseband signaling is assumed. Thus, it can be said that baseband signal x is transmitted from the transmit node 210 through the channel 220 which can be dispersive, non-dispersive, frequency-selective, or frequency-flat. The signal r received at the receive node 230 through the channel 220 is a composite of some version of the transmitted signal x and noise n. That is, the received signal r can be expressed as follows:

$$r = \hat{x} + n \quad (1)$$

where $\hat{x}$ represents a version of the transmitted signal x received at the receive node 230. The noise n can be viewed as including any unwanted signals including interferences (from other cells, mobile stations, thermal noise, etc.) as well as interferences described above.

The receive node 230 is structured to perform enhancement processing on the received signal r to increase the effective SINR of the communication link between transmit node 210 and the receive node 230. Generally, enhancement processing can be viewed as amplifying the transmitted signal x and/or reducing the noise n. The receive node 230 demodulates, equalizes and decodes the baseband signal to reproduce the information bits that were encoded and modulated at the transmit node 210.

Regarding the transmit node 210 and the receive node 230, it is recognized that these nodes can perform many other functions. For example, the transmit node 210 can perform error correction coding, interleaving, parity checking bits generation, and so on. The receive node 230 can perform functions such as despreading and correlating the received signal. Thus, the discussion above with regard to the transmit node 210 and the receive node 230 should not be taken to be limiting.

Figure 3:
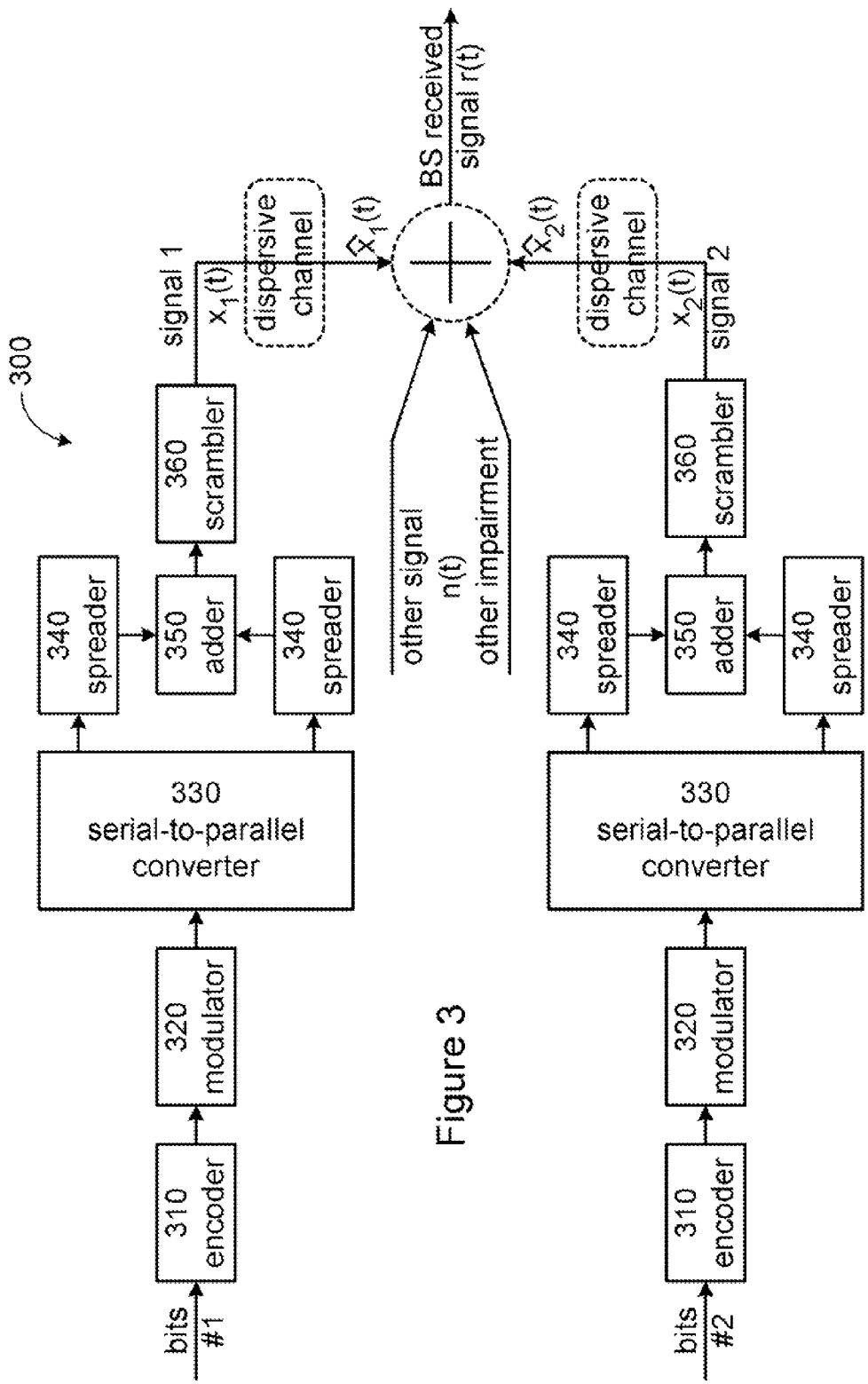
FIG. 3 illustrates example diagrams representing models of a WCDMA/HSPA uplink transmission and reception.

For a discussion regarding interference cancellation, a block diagram representing a model of a WCDMA/HSPA uplink transmission and reception illustrated in FIG. 3 is used. In this instance, the mobile terminal 130 is the transmit node and the base station 110 is the receive node. This also should not be taken to be limiting. In the downlink direction, it is contemplated that some or all mobile terminals 130 may also perform signal enhancement processing to which one or more aspects of the disclosed subject matter are applicable.

The model illustrated in FIG. 3 may be viewed to as a being an instance of the transmit node 210 shown in FIG. 2. In FIG. 3, information bits of a first signal (labeled "bits #1") are encoded by an encoder 310 to produce encoded bits according to a forward-error-correcting (FEC) code, which are modulated by a modulator 320 to produce transmitted symbols. For ease of reference, the information bits of the first signal (bits #1) will be referred to as the first information stream. Then it can be said that the encoder 310 encodes the first information stream to produce a first encoded information stream, which is modulated by the modulator 320 to produce a first symbol stream. The first symbol stream is mapped by a serial-to-parallel converter 330 to one or multiple channelization codes. FIG. 3 illustrates transmitting two channelization codes for the first symbol stream. However, the number of channelization codes can be one or more than two.

In FIG. 3, the transmitted symbols in the first symbol stream are separately spread by spreaders 340 on each of the channelization codes to produce spread signals corresponding to the channelization codes, and an adder 350 sums the spread signals produced by the spreaders 340. The summed spread signals from the adder 350 are scrambled by a scrambler 360 to produce a first signal $x_1$ which is transmitted. In practice, other data and control channels are mapped on additional channelization codes. But for the purposes of this discussion and without loss of generality, these signals are omitted. In an aspect, the first symbol stream is a symbol domain signal and the first signal $x_1$ is a chip domain signal.

The first signal $x_1$ is transmitted through a radio channel to the receive node 230 (e.g., a base station). The channel may be dispersive. FIG. 3 also shows a second signal $x_2$, generated in a similar fashion to the first signal $x_1$, as being transmitted to the receive node 230. The signals $x_1$ and $x_2$ can be transmitted from the same user, but via different transmit antennas in the case of SU-MIMO (with the same scrambling code), or from different users in the case of multi-user scheduling or MU-MIMO (with different scrambling codes). Note that there can be more than two signals generated and transmitted to the receive node 230 and the concepts discussed herein can be generalized to any number of such generated signals. But for ease of explanation, only two are illustrated.

The base station receives a signal r, which includes some versions of $x_1$ and $x_2$ (denoted respectively as $\hat{x}_1$ and $\hat{x}_2$) along with other signals (e.g., control channels, low-rate data channels), and other impairments (other-cell interference, thermal noise). That is, the signal r received at the base station can be expressed as follows:

$$r = \hat{x}_1 + \hat{x}_2 + n \quad (2)$$

Again, the noise signal n can be viewed as including any unwanted signals including interference. Just as an aside, the received signal r can be generally expressed as follows:

$$r = \sum_{k=1}^{m} \hat{x}_k + n \quad (3)$$

where m represents the number of signals received by the receive node 230.

As indicated above in the background section, there are at least two issues with the CDMA system. As far as the inventors are aware, the design choices of code-specific versus code-averaged design and chip-domain versus symbol-domain processing has not been addressed in the prior art.

To address one or more shortcomings of the prior art, an aspect of the present disclosure is directed to a turbo-IC receiver. The proposed turbo-IC receiver, which is be suitable for CDMA systems among others, can include some or all of the following elements:

Code-averaged equalization (such as chip-level equalization or symbol-level equalization like Rake, G-Rake or G-Rake+);
  Chip-level code-specific interference over-cancellation; and
  Symbol-level code-averaged desired signal add-back.

With code-averaged equalization, the equalization weights do not adapt to the symbol-dependent spreading code. In other words, the equalization weights can be shared by symbols associated with different OVSF codes or in different symbol intervals. Similarly, with code-averaged desired signal add-back, the add-back component does not reflect the symbol-dependent spreading code. In particular, the scaling factor used in the add-back process can be shared by symbols associated with different OVSF codes or in different symbol intervals. In contrast, the process of chip-level code-specific interference over-cancellation involves cancellation of an estimate of an interfering signal, which accounts for symbol-dependent spreading codes.

The chip-level code-specific interference over-cancellation has a number of advantages. The following is a list of just some of the advantages:

It can result in a unified interference cancellation processing treating spatial-multiplexing interference, other-user interference, and inter-symbol interference in a same way. The interference cancelled chip-level received signal can be shared by all signal detectors processing different user signals;
  Chip-level cancellation can avoid cumbersome calculation of code cross-correlations, which is required by symbol-level interference cancellation; and
  Code-specific cancellation can achieve a high-level of cancellation efficiency.

However, chip-level code-specific interference cancellation can result in a desired signal component being cancelled. We refer to this as over-cancellation. To address this issue, in one aspect, the desired signal, or at least a portion thereof, can be added back in the symbol-level, post G-Rake/G-Rake+ combining. This added-back component can be code-averaged.

There are a number of advantages associated with symbol-level code-averaged desired signal add-back. The following is a list of just some of the advantages:

Due to the code-averaged add-back, the need to account for code auto-correlations can be reduced or even eliminated entirely; and
  The structure is mathematically consistent with an approach where the impairment covariance matrix is estimated based on unused code despread values. An example of this approach to estimate the impairment covariance matrix is described in Fulghum et al. (US Patent Publication, 2008/0304554) incorporated in its entirety by reference herein. Using the unused code despread values can produce a very reliable estimate of the impairment covariance, which is important in generating accurate equalization weights.

The code-averaged equalization component in the proposed turbo-IC solution can be performed at the chip-level (e.g., MMSE chip equalization) or the symbol-level (e.g., G-Rake/G-Rake+). It can be implemented in the time domain or in the frequency domain. For explanation purposes, symbol-level equalization such as G-Rake or G-Rake+ will be described below.

Figure 4:
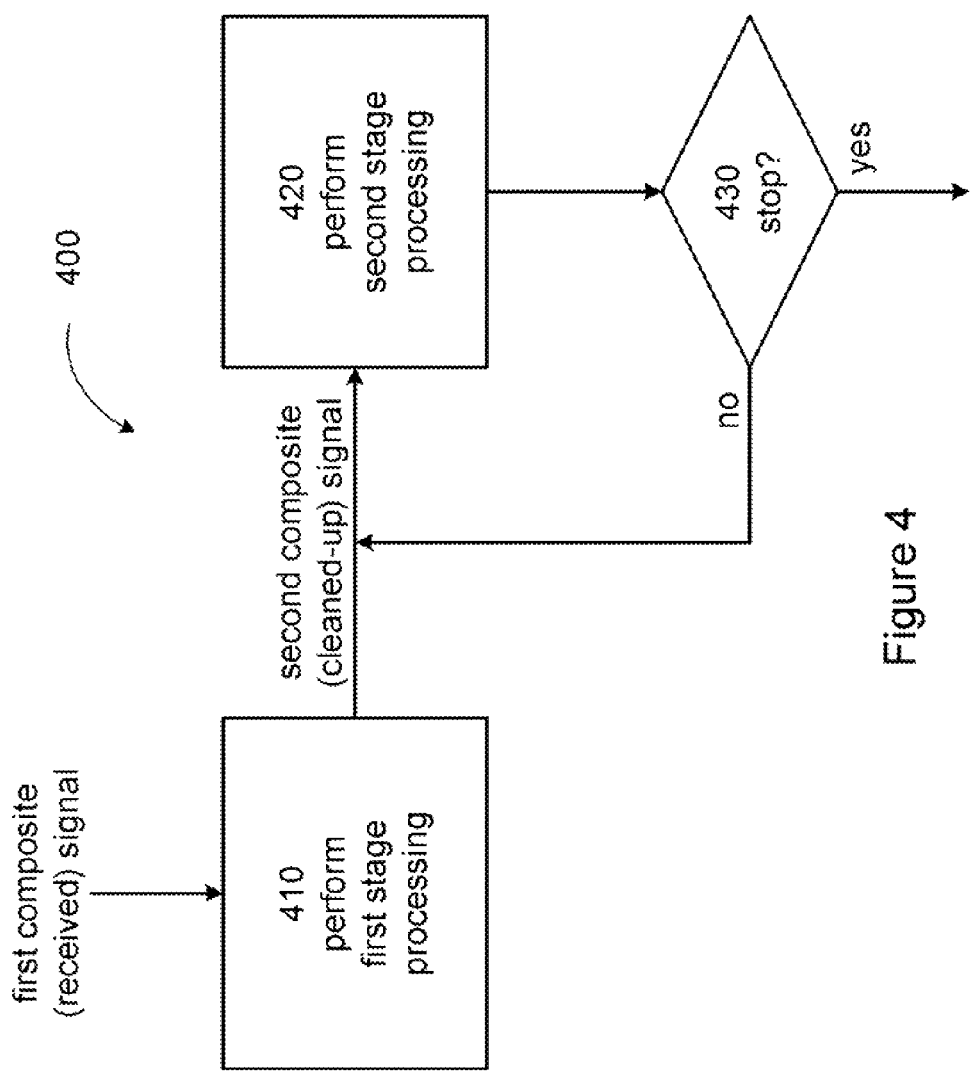
FIG. 4 illustrates a flow chart of an example method for processing a received signal.

One aspect of the turbo-IC solution is illustrated in a flow chart of a method, which can be performed at a receive node 230 (e.g., a base station 110 in the uplink), as illustrated in FIG. 4. In the example method 400, interference cancellation is accomplished by the receive node 230, and in particular by a turbo-IC receiver (to be described in further detail) of the receive node 230. Broadly, in the method 400, the receive node 230 performs a first stage processing of a symbol of interest contained in a first composite signal in step 410. Subsequently, the receive node 230 performs a second stage processing 420 on the same symbol of interest contained in a second composite signal in step 420.

The first composite signal may be the received signal r. That is, it may be assumed that no interference cancellation has yet occurred for the symbol of interest prior to entering the first stage processing step 410. After the first stage processing 410, a cleaned-up signal is generated by canceling at least a portion of the interferences of the first composite signal. The cleaned-up signal can be viewed as an interference-reduced version of the first composite signal. Similarly, after the second stage processing 420, a cleaned-up signal is generated by canceling at least a portion of the interference contained in the second composite signal. The cleaned-up signal can be viewed as an interference-reduced version of the second composite signal.

As seen in FIG. 4, in a first iteration of the method 400, the second stage processing 420 is performed on the interference-reduced version of the first composite signal. That is, the second composite signal is the interference-reduced version of the first composite signal. Then the interference reduced version of the second composite signal is also an interference-reduced version of the first composite signal.

In step 430, the receive node 230 determines whether the processing can stop. This can be determined in a variety of ways such as reaching a predetermined level of interference cancellation, reaching a predetermined number of iterations of the second stage processing 420, reaching CRC check, reaching a predetermined level QoS parameters such as of SINR, BER, FER, and so on.

If further processing is needed ("no" branch from 430), the second stage processing 420 is performed again to further clean the first composite signal. Thus, when the receive node 230 performs the second stage processing 420, the second composite signal is the interference-reduced version of the first composite signal or an interference-reduced version of the second composite signal of a previous iteration of the second stage processing 420.

Note that whenever the first or the second stage processing 410, 420 is performed, interference characteristics of the cleaned-up signal can be different from the original signal. Thus, preferably in the second stage processing 420, impairment covariance and/or combining weight weights are updated accordingly.

In an aspect, the first and second composite signals are signals in the chip domain. One or both composite signals can include signals received from multiple antennas. Also, one or both composite signals can include multiple receive samples per chip. That is, one or both composite signals can be oversampled. As will be described further below, in the first stage processing 410, the first composite signal is despread to extract one or more symbols for processing in the symbol domain, and the processed symbols are regenerated as a signal in the chip domain. This first stage regenerated signal is used to cancel interferences in the chip domain to output an interference reduced version of the first composite signal.

Similarly, in the second stage processing 410, the second composite signal is despread to extract one or more symbols for processing in the symbol domain, and the processed symbols are again regenerated in the chip domain. The second stage regenerated signal is used to cancel interference in the chip domain to output an interference reduced version of the second composite signal, which as mentioned above, is a further interference reduced version of the first composite signal.

Figure 5:
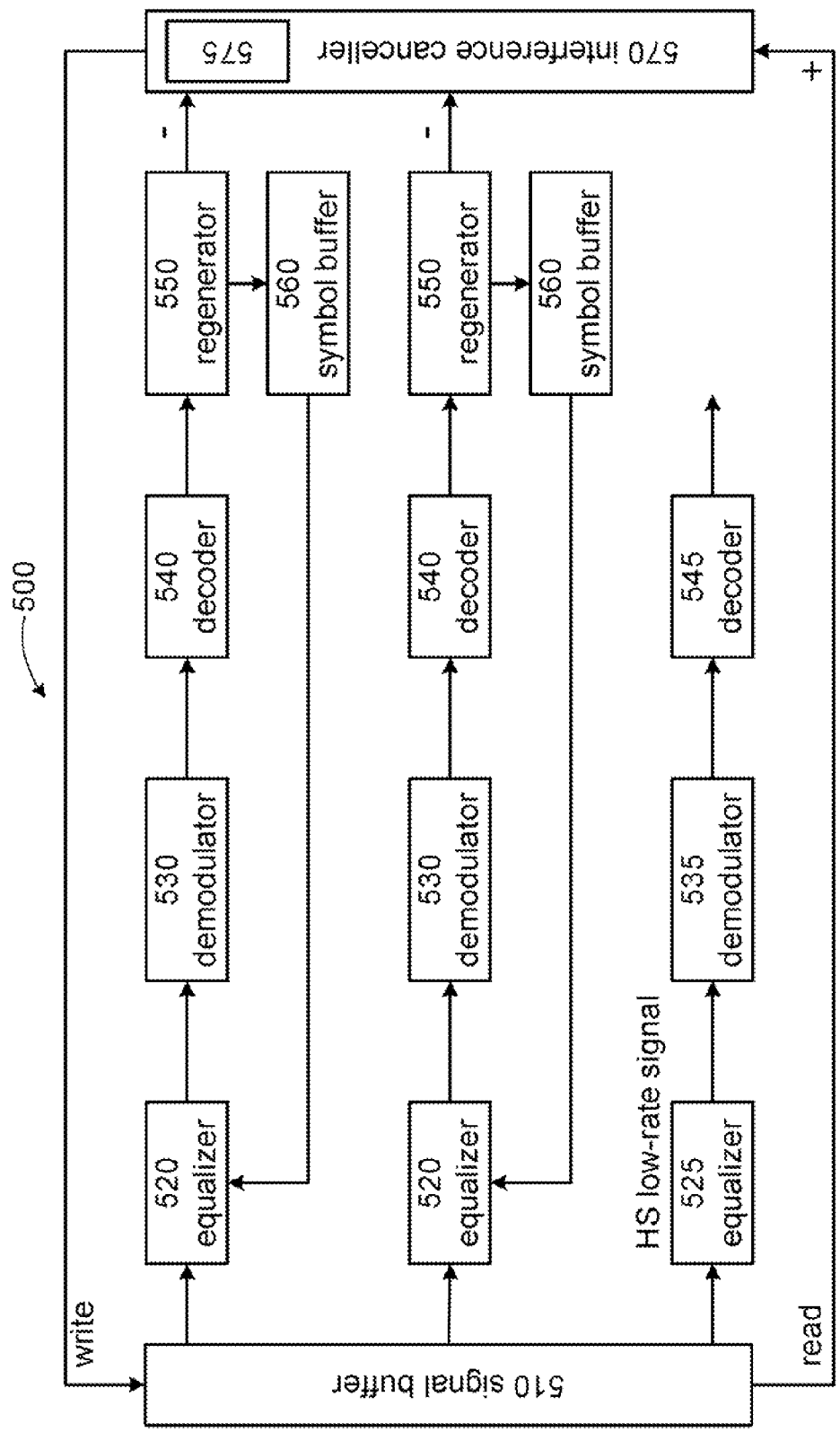
FIG. 5 illustrates an example embodiment of a receiver.

An example embodiment of a turbo-IC receiver 500 structured to perform the method 400 of interference cancelling is illustrated in FIG. 5. For brevity, the turbo-IC receiver 500 will simply be referred to as the "receiver" 500. The receiver 500 comprises an signal buffer 510 structured to store the received signal at the first stage or an interference reduced version of the received signal at later stages, one or more equalizers 520 structured to equalize signals from the signal buffer 510, one or more demodulators 530 structured to demodulate the equalized signals, one or more decoders 540 structured to decode the demodulated signals, one or more signal regenerators 550 structured to regenerate signals, one or more symbol buffers 560 structured to store symbols of different stages, and an interference canceller 570 structured to cancel interferences. The interference canceller 570 can include a regeneration buffer 575.

The receiver 500 can also include an equalizer 525, a demodulator 535 and a decoder 545 to process WCDMA/HSPA low-rate signals. These can be same or different from the equalizers 520, the demodulators 530 and the decoders 540. It should be noted that actuality, these can be any signals that are not processed in an iterative manner. As such, they can be of any rate, not just low rate. But for ease of reference, they are referred to as "HS low-rate signal" in the Figures.

The receiver 500 can be viewed as being included in the receive node 230 illustrated in FIG. 2. In the uplink transmission, the receiver 500 can be a receiver of a base station, and in the downlink transmission, it can be a receiver of a mobile terminal. As expressed in equation (2) above, the receive node 230 receives a signal r which is a combination of signals as $\hat{x}_1$ and $\hat{x}_2$ (versions of originally transmitted first and second signals $x_1$ and $x_2$) plus other signals and impairments or a noise signal n.

In FIG. 5, two chains of the equalizer 520, the demodulator 530, the decoder 540, the signal regenerator 550 and the symbol buffer 560 are shown so as to process the two signals $x_1$ and $x_2$ in parallel. Each chain processes the received signal r for the signal of interest—either $x_1$ or $x_2$. For example, the signal of interest for the top chain (also referred to as the first chain) processes can be the first signal $x_1$, and the signal of interest for the second (middle) chain can be the second signal $x_2$. While two chains are shown, this is not a limitation. The number of chains can be any number.

For each signal of interest, e.g., the first signal $x_1$, the equalizer 520 equalizes the signal stored in the signal buffer 510 (which can be the received signal r or an interference reduced version of the received signal) to produce a stream of equalized symbols corresponding to the signal of interest. For example, the first chain equalizer 520 in FIG. 5 produces a stream of equalized symbols corresponding to the first symbol stream produced by the top modulator 320 in FIG. 3. Generally, the equalized symbols of the stream produced by the equalizer 520 can be viewed as estimates of the symbols in the symbol stream produced by the corresponding modulator 320. It can be said that from the perspective of a particular symbol of interest, the equalizer 520 equalizes that symbol. The equalizer 520 also equalizes other symbols in the same symbol stream (i.e., of the same signal of interest) which can be sources of own signal interference. Symbol streams of other streams (i.e., of other signals) which are other interference sources to the symbol of interest are also equalized.

Figure 6:
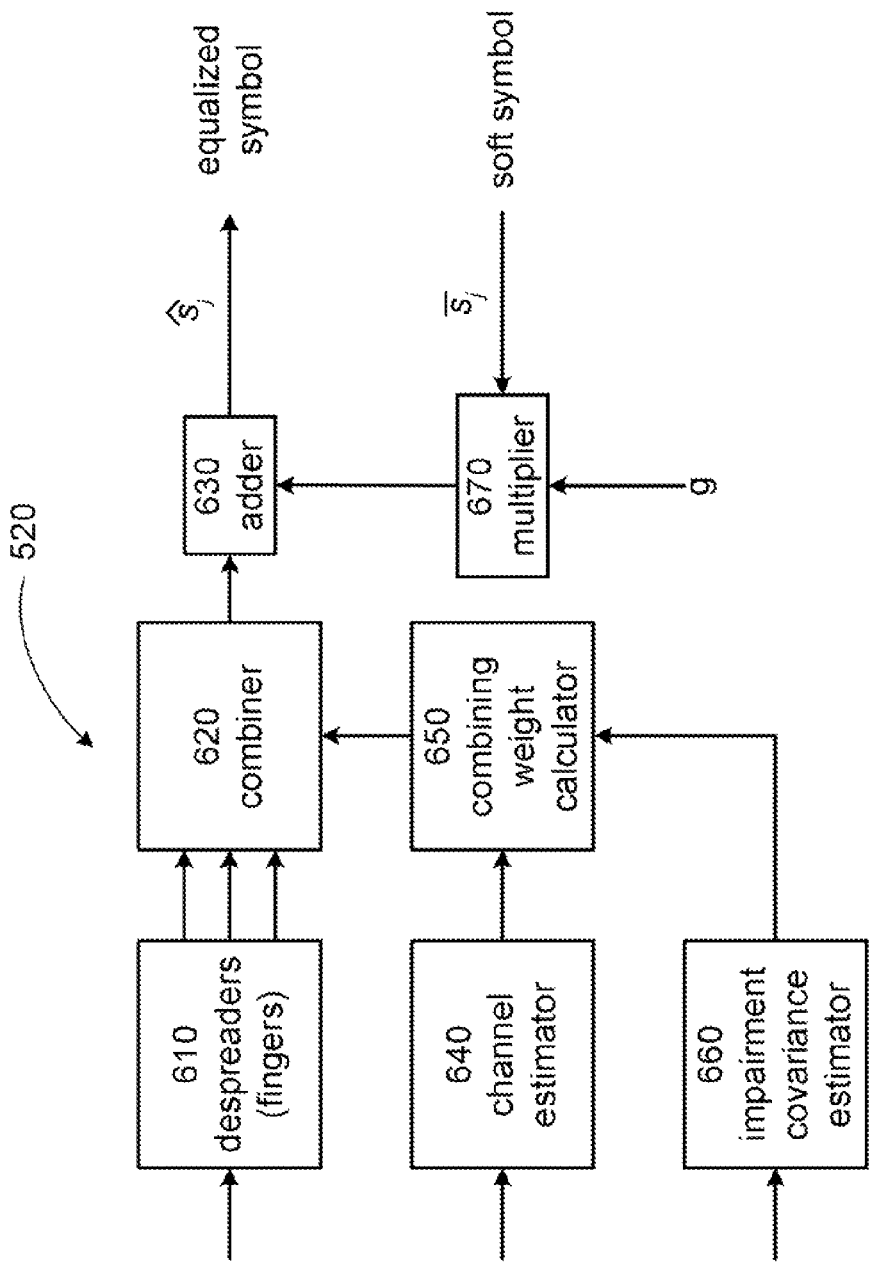
FIG. 6 illustrates an example embodiment of an equalizer.

An example architecture of the equalizer 520 is illustrated in FIG. 6. The equalizer 520, which can be a G-Rake+ equalizer, includes a despreader 610 with a plurality of fingers structured to despread an input signal in the chip domain based on a specific code and a combiner 620 structured to combine the despread values to output a stream of symbol values. That is, the despreader 610 and the combiner 620 extract symbols (including the symbol of interest) in the symbol domain from the signal of interest in the chip domain. The equalizer 520 also includes a combining weight calculator 650 structured to calculate the weight of each finger, a channel estimator 640 structured to estimate the channel and an impairment covariance estimator 650 structured to estimate the impairment covariance of the composite signal. In this figure, the equalizer 520 is structured to perform a signal add-back process. As shown, a soft symbol $\bar{s}$ is added back to by an adder 630 form a fully equalized symbol $\hat{s}$. A multiplier 670 can scale the soft symbol $\bar{s}$ by a scaling factor g to ensure that the fully equalized symbols $\hat{s}$ an MMSE or ML symbol estimate.

Referring back to FIG. 5, the demodulator 530 demodulates the equalized symbol to produce demodulated data, which can be a number of encoded bit soft values corresponding to the symbol of interest. The decoder 540 decodes the demodulated data to produce likelihood indicators, which can be a number of bit log-likelihood ratios (LLR) for each of the encoded bits. Other examples of the likelihood indicators include simple ratios and probabilities. Note that any type of likelihood indications can suffice.

The signal regenerator 550 regenerates a signal based on the likelihood indicators from the decoder 540. The regenerated signal represents an estimate of the signal transmitted from the transmit node 210. The regenerated signal is provided to the regeneration buffer 575.

Figure 7:
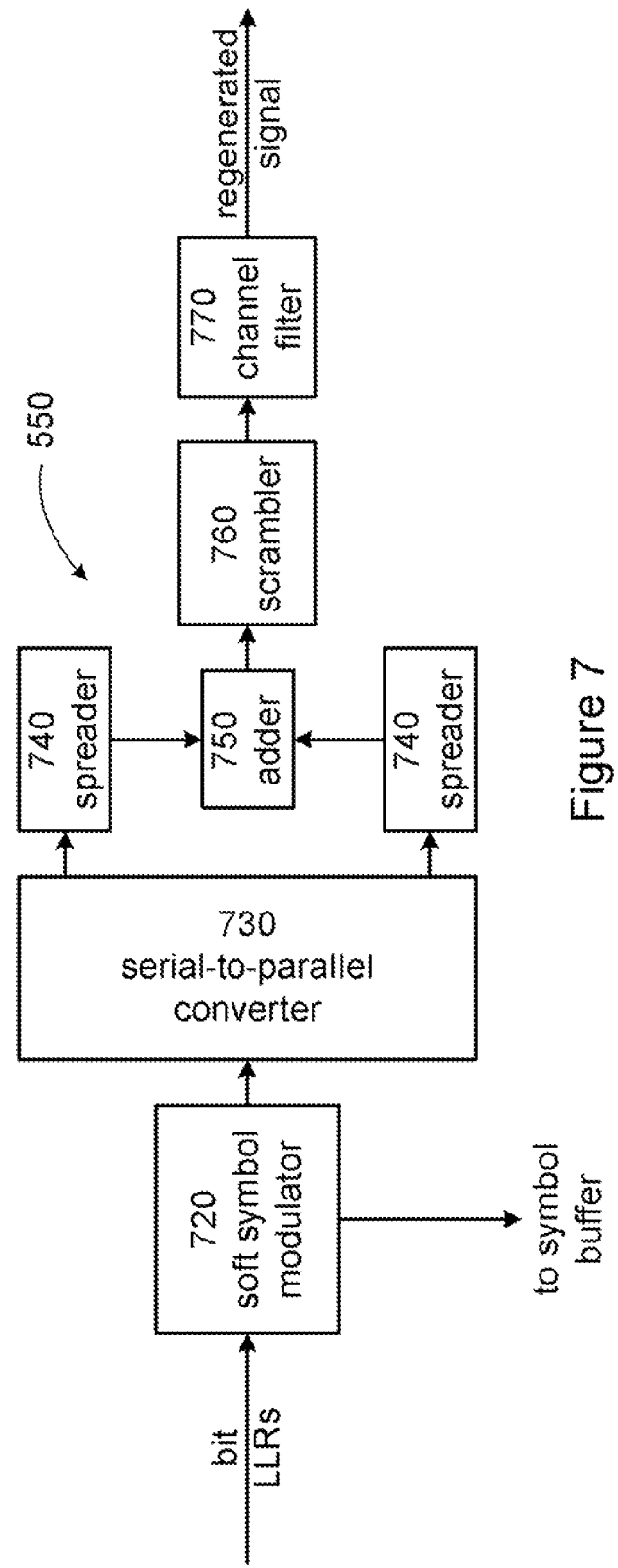
FIG. 7 illustrates an example embodiment of a signal regenerator.

An example architecture of the signal regenerator 550 is illustrated in FIG. 7. The signal regenerator 550 includes a soft symbol modulator 720 structured to form a soft symbol based on likelihood indicators (e.g., LLRs) output by the decoder 540, a serial-to-parallel converter 730 structured to map the soft symbol into the channelization codes, one or more spreaders 740 structured to spread the soft symbol on each of the channelization codes, an adder 750 structured to sum the spread signals, a scrambler 760 structured to scramble spread signals, and a channel filter 770 structured to channel-filter the scrambled signals. The output of the channel-filter 770 is the regenerated signal, i.e., the estimate of the transmitted signal. Note that the soft symbols formed by the soft symbol modulator 720 are also provided to the symbol buffer 560 in this example embodiment.

Referring back to FIG. 5, the regenerated signals of the signal regenerators 550 of the two chains can be estimates of the first and second signals $x_1$ and $x_2$ of FIG. 3. That is, the regenerators 550 provides $x_{1,est}$ and $x_{2,est}$ as the regenerated signals to the regeneration buffer 575. In one embodiment, one estimated signal, e.g., $x_{1,est}$, may be stored separately in the regeneration buffer 575 apart from one or more other estimated signals, e.g., $x_{2,est}$. In another embodiment, a sum of two or more estimated signals, e.g., $x_{1,est}$ and $x_{2,est}$, may be stored in the regeneration buffer 575. Regardless of the manner in which the estimated signals are stored, the interference canceller 570 cancels the estimated signals stored in the regeneration buffer, from the total received signal, and the cleaned-up version of the received signal can be used in a subsequent stage of signal detection. In one aspect, interference canceller 570 reads the contents of the signal buffer 510, cancels the interference, and writes the result back to the signal buffer 510.

Figure 8A:
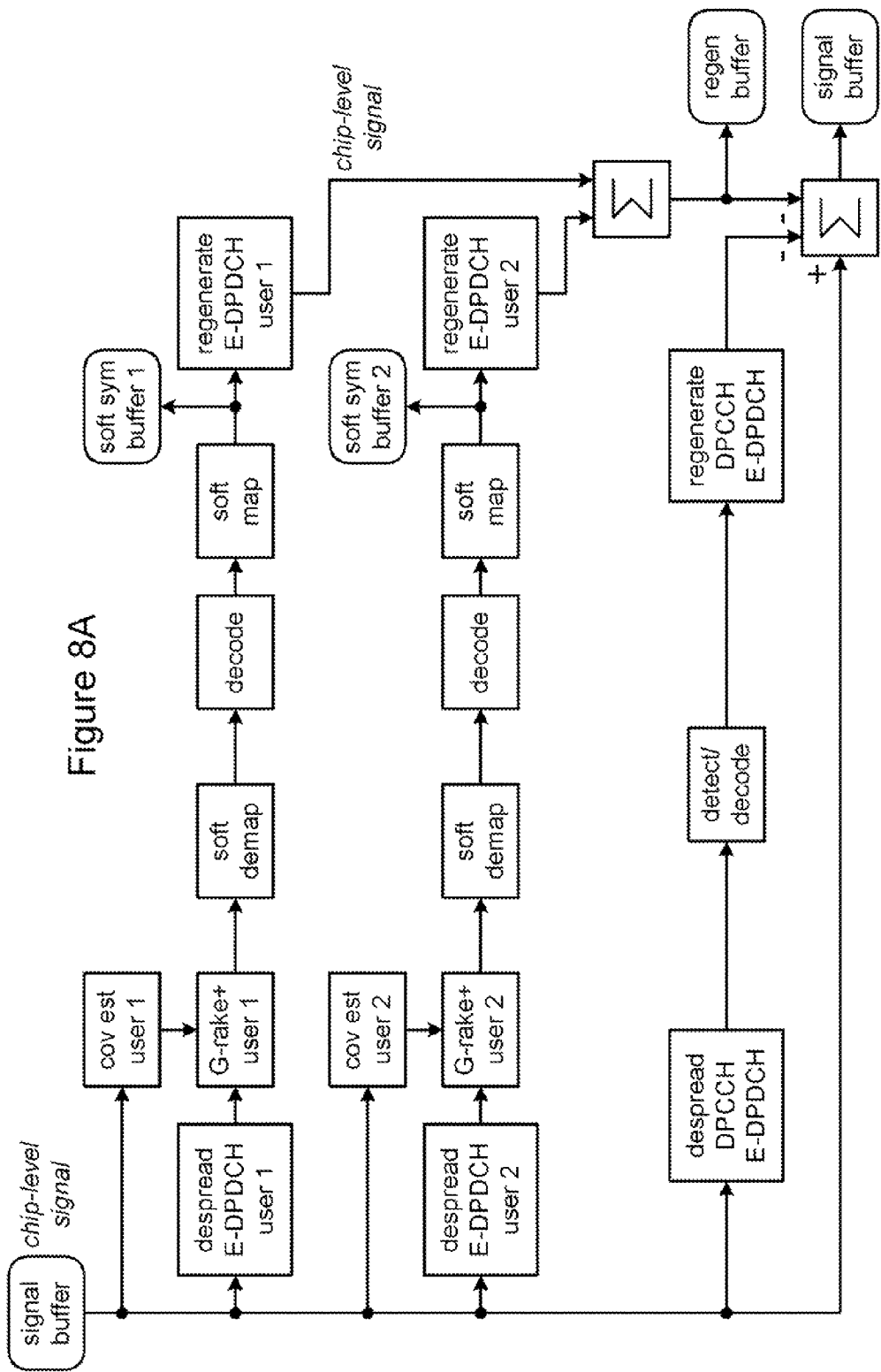
FIGS. 8A and 8B illustrate block diagrams of an example proposed turbo-IC solution respectively in the first stage processing and subsequent second stage processing.
Figure 8B:
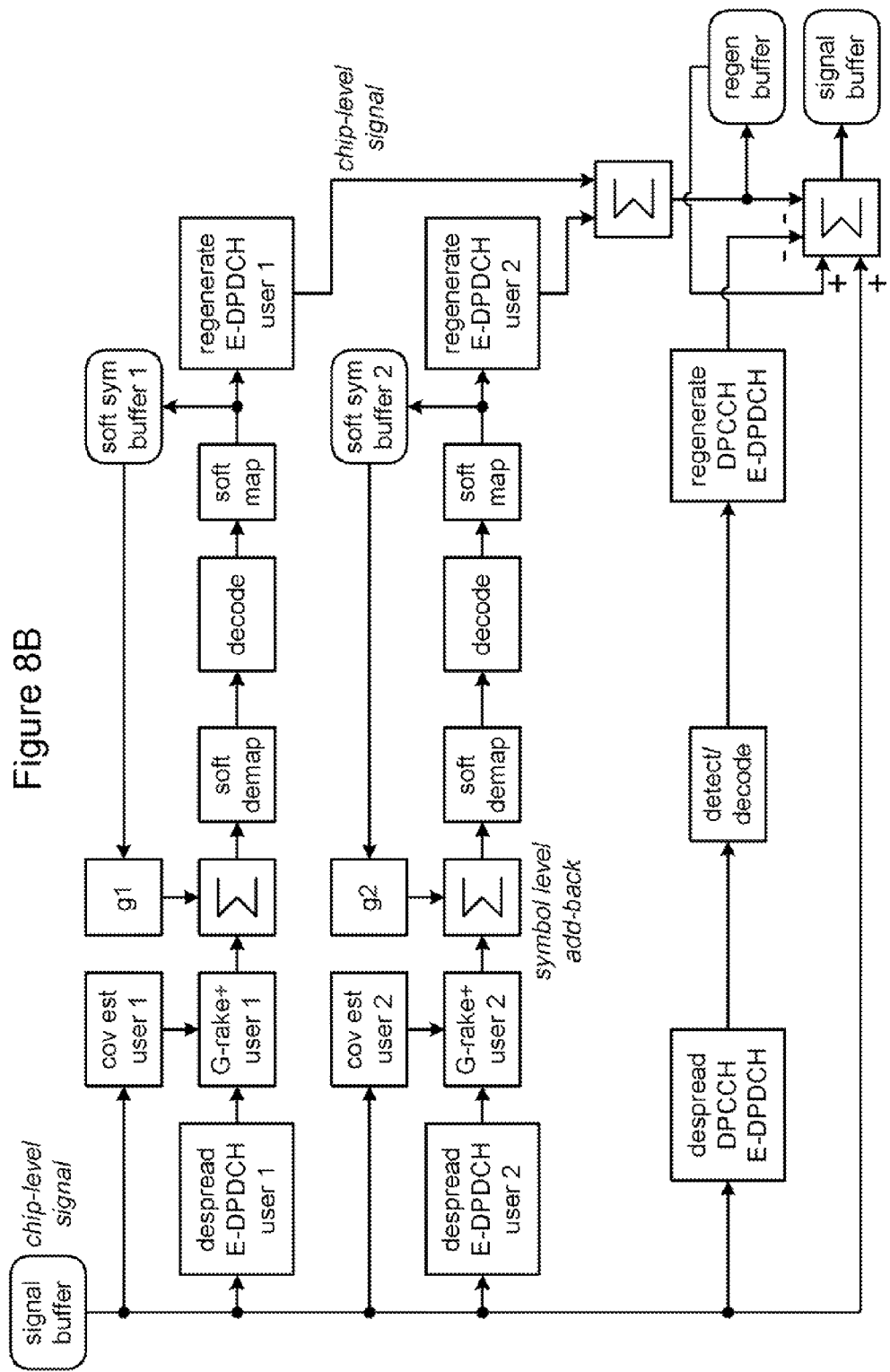

FIGS. 8A and 8B illustrate block diagrams of an example proposed turbo-IC solution for CDMA respectively in the first stage processing and subsequent second stage processing. In the first stage processing illustrated in FIG. 8A, the received signal can be stored in the signal buffer 510 as a chip domain signal (upper left "signal buffer" box). The chip-domain signal can be an over-sampled signal, e.g., two samples per chip per receive antenna. In FIG. 8A, it is assumed that there are two data signals to be detected, e.g., E-DPDCH's from users 1 and 2 corresponding to signals $x_1$ and $x_2$. Noted that the concept is applicable for other cases, e.g., single user or more than two users. In addition, there can be one or multiple control channels, e.g., DPCCH's and E-DPCCH's, to be detected.

For each user, the equalizer 520 despreads the received chip domain signal stored in the signal buffer 510 using the symbol-dependent spreading waveforms of the user to obtain a number of despread values for each E-DPDCH symbol of the user, one per finger. The equalizer 520 combines the multiple despread values corresponding to each symbol of interest using G-Rake or G-Rake+ combining weights. The combining weights can be code-averaged in the sense that symbols mapped to multiple orthogonal variable spreading factor (OVSF) codes and in multiple symbol periods may share the same set of combining weights. The G-Rake+ outputs are equalized values in the symbol domain, each representing an estimate for the corresponding symbol of interest. This equalization process in effect extracts a symbol in the symbol domain from the signal in the chip domain ("despread E-DPDCH user", "cov est user", "G-rake+ user" boxes).

The demodulator 530, which can be a soft demodulator, converts the equalized symbols into likelihood indicators such as LLRs ("soft demap" box). The likelihood indicators are then used by the decoder 540. The decoder 540 can be a soft-input and soft-output decoder that produces a refined set of likelihood indicators such as bit LLRs, each corresponding to an encoded bit ("decode" box).

The soft outputs from the decoder 540 are converted to soft symbols by the soft symbol modulator 720 of the signal regenerator 550. The soft symbols are stored in the symbol buffer 560 ("soft sym buffer" box) as they are needed in subsequent turbo-IC processing for symbol-level add-back. Interference cancellation is based on these soft symbols. At any given stage, the symbols stored in the symbol buffer 560 are symbol estimates generated in that stage. In one aspect, interference cancellation is accomplished at the chip domain. As such, the stage symbol estimates are spread, scrambled, and channel filtered to produce the regenerated signal, which is an estimate of a user signal in the chip domain. In an aspect, the regenerated stage signal estimate in the chip domain output by the signal regenerators 550 is an estimate of the signals $x_1$ or $x_2$. The stage signal estimates $x_{1,est}$ and $x_{2,est}$ can be stored in the regeneration buffer 575 individually or as a sum. In FIG. 8A, the sum is stored (upper summation and "regen buffer" boxes).

In addition to the user signals, processing can be carried out in parallel to obtain estimates of other signals, data or control, in the chip domain. There can be various choices regarding the ordering of processing of control channels, low-rate data channels, and high-rate data channels. For example, the control channels can be processed and cancelled first before the data channels are processed in receiver 500. In this case, both low-rate and high-rate data channels are included in the iterative turbo-IC process. Alternatively, the control channels and all or a selective subset of the low-rate data channels are detected first. In this case, only the high-rate data channels and a selective subset (or none) of the low-rate data channels are included in the iterative turbo-IC process ("despread DPCCH E-DPCCH", "detect/decode", "regenerate DPCCH E-DPCCH" boxes).

The interference canceller 570 cancels the regenerated data signals and control signals from the received signal stored in the signal buffer 510 (lower summation box). The cleaned-up signal is stored back to the signal buffer 510 after interference cancellation (lower right "signal buffer" box). Since the regenerated data signals and control signals are obtained using the symbol and user dependent spreading codes (the combination of channelization codes and pseudo random scrambling codes), code-specific interference cancellation is achieved.

The cancellation of all the regenerated data signals and control signals will result in an over-cancellation in the cleaned-up signal in the sense that a portion of all the desired signals is absent in the signal stored back to the signal buffer 510 by the interference canceller 570. An add-back operation is performed in subsequent receiver processing, i.e., in the second stage processing, to address the over-cancellation.

In summary, the first stage processing of the proposed CDMA turbo-IC receiver uses code-averaged symbol-level equalization such as G-Rake or G-Rake+ and chip-level code-specific over-cancellation, which not only removes the interference (ISI, code-multiplexed interference, and spatial-multiplexed interference) but also removes a desired signal component. The over-cancellation approach allows the same signal buffer to be shared by multiple user signal detectors. Further, interference from all sources (ISI, multi-user) can be handled in a unified way.

The second stage processing illustrated in FIG. 8B is similar to the first stage processing. One important difference, however, is the symbol add-back (addition of scaling factor "g" and summation boxes). As mentioned earlier, the interference cancellation process in the previous stage results in a desired signal component also being cancelled and thus missing in the signal buffer. The add-back operation re-inserts such a missing desired component in the signal detection path.

In one aspect, the receiver 500 performs a signal add-back in the symbol-domain, i.e., after despreading and G-Rake+ combining. Such a signal add-back operation can be code-averaged in the sense that it does not account for the symbol-dependent spreading codes. For example, neither the soft symbol modulator 720 nor the scaling factors g1 and g2 account for the symbol-dependent spreading codes. The signal add-back operation adds back a scaled version of the soft symbols generated based on the encoded likelihood indicators provided by the decoder 540. Recall that the signal generator 550 stores the soft symbol values in the soft symbol buffer 560 in the previous stage (first stage or previous run of second stage). The equalizer 520 determines the scaling factor $g_1$, $g_2$ by the user-specific G-Rake or G-Rake+ combining weights of the present stage in addition to the user-specific net channel response. The scaling factor may be further adjusted according to the power difference between E-DPDCH and DPCCH, if the net channel response is estimated based on DPCCH, or according to the to the power difference between E-DPDCH and E-DPCCH, if the net channel response is estimated based on E-DPCCH.

The code-averaged symbol-level add-back after chip-level over-cancellation can result in a small code-specific portion of the desired signal still missing after the signal add-back. This missing code-specific portion is due to the non-zero spreading code auto-correlation values at the non-zero lags. It can be shown mathematically that the statistics of such a code-specific portion are accounted for when the impairment covariance is estimated based on despreading the interference cancelled signal stored in the signal buffer based on unused codes in the OVSF code-tree. Thus, the described approach fits well with G-Rake+, which estimates the impairment covariance matrix using unused code despread values.

After adding back the desired signal component, the equalizer 520 obtains equalized symbol values (output of summation box between "G-rake+ user" and "soft demap" boxes), each representing an estimate for a symbol of interest. The subsequent operations in the current stage are the same or similar as those in the first stage. The main difference is that as the new regenerated signals, the current stage signal estimates, are used for interference cancellation, previous versions of regenerated data signals are added back to undo the cancellation done in the previous stage (output from "regen buffer" box to lower summation box).

Figure 9:
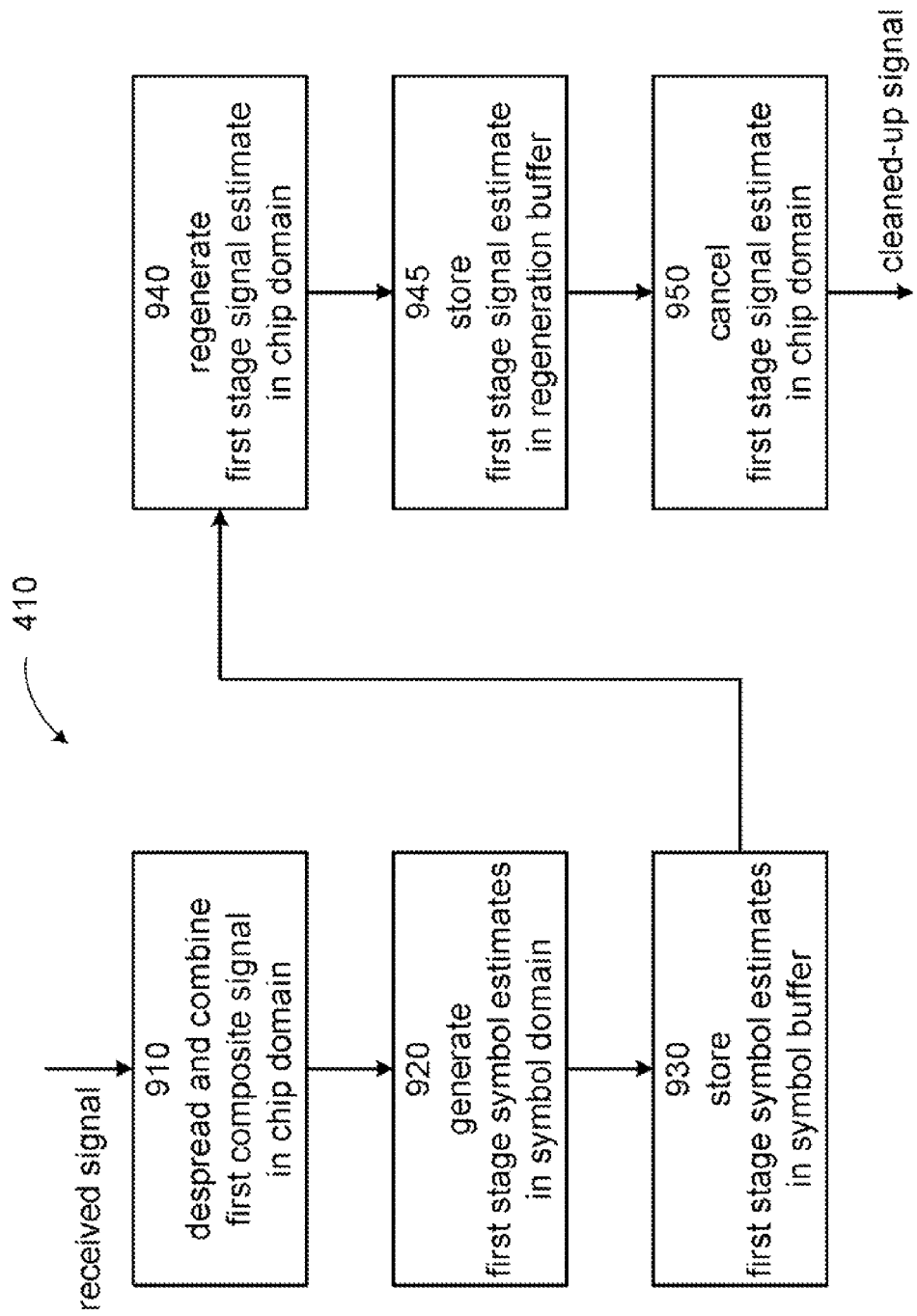
FIG. 9 illustrates a flow chart of an example process to implement a first stage processing.

FIG. 9 illustrates a flow chart of an example process to implement the first stage processing step 410. In step 910, the despreader 610 and the combiner 620 despreads and combines the first composite signal based on channelization code or codes and first combining weights. The first combining weights of the fingers of the despreader 610 are determined by the combining weight calculator 650 based on the channel estimation provided by the channel estimator 640 and the impairment covariance of the first composite signal provided by the impairment covariance estimator 650. The first composite signal, which is assumed to be a signal in the chip domain, can be read from the signal buffer 510. First stage equalized symbols in the symbol domain are obtained from the performing the first stage despreading and combining step 910 in the chip domain. The first stage equalized symbols can be viewed as a stream of equalized symbols.

In step 920, first stage symbol estimates are generated based on first stage equalized symbols. The first stage symbol estimates can also be viewed as a stream of symbols whose values are estimates of the symbols carried in the signal of interest transmitted from the transmit node. From the perspective of any particular symbol of interest in the stream, one of the first stage symbol estimates provides an estimate of that symbol of interest. But in addition, the other symbol estimates amongst the first stage symbol estimates are viewed as estimates of interfering symbols from the perspectives of that particular symbol of interest in the stream.

FIG. 10 illustrates a flow chart of an example process to implement the first stage generating step 920 to obtain the first stage symbol estimates. In step 1010, the demodulator 530, a soft demodulator in this instance, demodulates the first stage equalized symbols to obtain first stage demodulated bit soft values corresponding to the symbol of interest. In step 1020, the decoder 540 decodes the first stage demodulated bit soft values to obtain first stage likelihood indicators such as LLR, ratios, and so on. The decoder 540 in this instance can be a soft-input soft-output decoder that produces a refined set of indicators. Then in step 1030, the soft symbol modulator 720 (of the signal regenerator 550) soft modulates the refined set of indicators to generate the first stage symbol estimates.

Referring back FIG. 9, the signal regenerator 550 stores the first stage symbol estimates in the symbol buffer 560 in step 930. As indicated multiple times above, the first stage symbol estimates are used to perform add-back process in the symbol domain in the second stage processing 420 to account for the chip-level code-specific interference over-cancellation.

In step 940, the signal regenerator 550 processes the first stage symbol estimates to regenerate a first stage signal estimate in the chip domain. FIG. 11 illustrates a flow chart of an example process to implement the first stage regenerating step 940 to obtain the first stage signal estimate. The serial-to-parallel converter 730 maps the first stage symbol estimates into one or more channelization codes in step 1110. Each of the symbols is spread by spreaders 740 in step 1120 on each of the channelization codes in step 1120 to obtain corresponding spread signals. The spread signals are summed together by the adder 750 in step 1130, and the summed spread signals are scrambled by the scrambler 760 in step 1140 to obtain a scrambled signal. The channel filter 770 channel-filters the scrambled signal in step 1150 to obtain the first stage signal estimate in the chip domain. The first stage signal estimate can be viewed as an estimate of the transmitted signal, e.g., $x_{1,est}$ or $x_{2,est}$, in the chip domain When there is only one channelization code, steps 1110 and 1130 need not be performed.

Referring back to FIG. 9, the signal regenerator 550 stores the first stage signal estimate in the regeneration buffer 575 in step 945. Note that same process can be performed for different user and the resulting first stage signal estimates can all be stored in the regeneration buffer 575. The signal estimates can be stored individually or as a sum in the regeneration buffer 575.

In step 950, the interference canceller 570 cancels the first stage signal estimates of different users (as well as the control signal(s)) from the first composite signal in the chip domain. As a result, an interference-reduced version of the first composite signal (of the received signal) is obtained.

Figure 12:
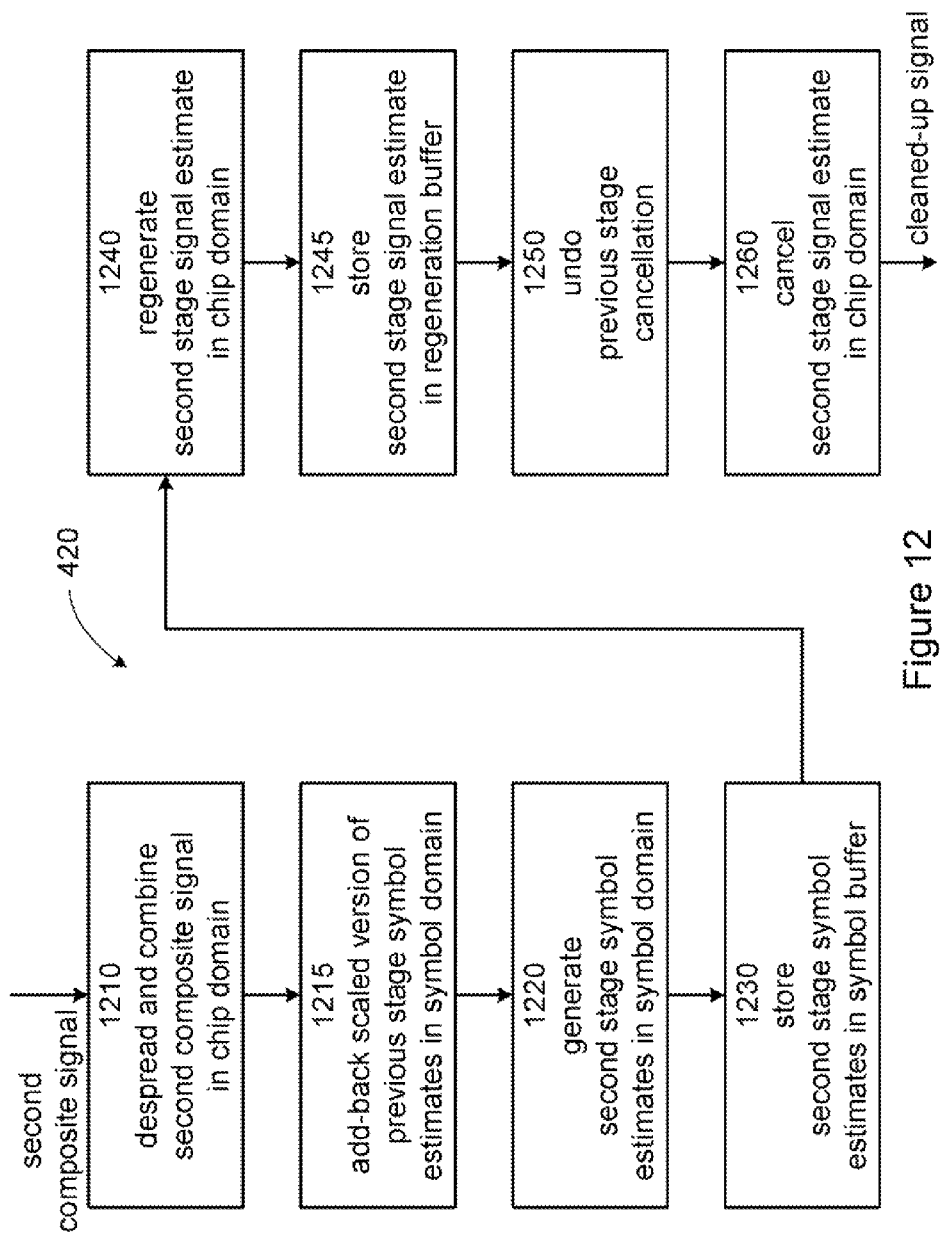
FIG. 12 illustrates a flow chart of an example process to implement a second stage processing.

FIG. 12 illustrates a flow chart of an example process to implement the second stage processing step 420. Many of the steps in FIG. 12 are similar to the steps in FIG. 9 of the first stage processing step 410. Therefore, not all steps will be described in detail. In step 1210, which is similar to step 910, the despreader 610 and the combiner 620 despreads and combines the second composite signal based on channelization code and second stage combining weights in the chip domain. The channel estimator 640, the impairment covariance estimator 650 and the combining weight calculator 650 cooperate to determine the second stage combining weight in a way similar to step 910.

Figure 13:
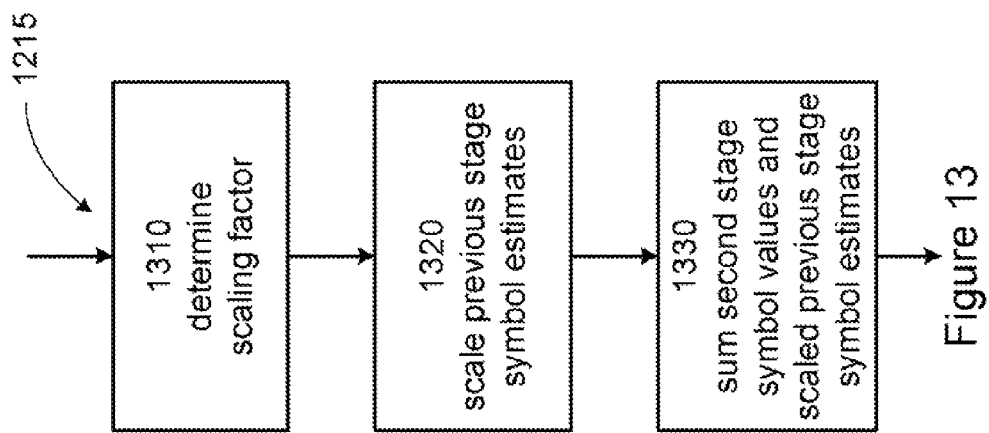
FIG. 13 illustrates a flow chart of an example process to perform a an add-back operation in the symbol domain to obtain fully equalized current stage equalized symbols.

However, in the second stage, the output of the combiner 620 is not fully equalized. Rather, second stage symbol values are obtained. To obtain the second stage equalized symbols, the equalizer 520 performs a second stage symbol add-back process in step 1215. FIG. 13 illustrates a flow chart of an example process to implement the add-back step 1215. In step 1310, the equalizer 520 determines a scaling factor g. In step 1320, the multiplier 670 scales the previous stage symbol estimates by the scaling factor g. In the first iteration of the second stage processing step 420, the previous stage symbol estimates are the first stage symbol estimates. Recall from FIG. 9 that the first stage symbol estimates, which form a stream of symbol values, are stored in the symbol buffer 560. Thus, in step 1320, the first stage symbol estimates can be retrieved from the symbol buffer 560. In any subsequent iteration of the second stage processing step 420, the previous stage symbol estimates are the second stage symbol estimates of the previous run of the second stage processing 420. Again, the previous stage symbol estimates can be retrieved from the symbol buffer 560. Then in step 1330, the adder 630 sums the scaled version of the previous stage symbol estimates and the second stage symbol values to obtain the second stage equalized symbols.

In one aspect, the scaling factor g is determined based on any of user specific G-Rake or G-Rake+ combining weights of the current second stage processing as well as the user-specific net channel response. For example, if the G-Rake or G-Rake+ combining weights are represented by a column vector w, and the net response is represented by a column vector h, then the scaling factor is simply $g=w^H h$ or $g=h^H w$, where the superscript H stands for Hermitian or conjugate transpose. The G-Rake+ combining weights can be code-averaged. In addition, when the net response is estimated based on DPCCH, the scaling factor can be further adjusted according to a power difference between E-DPDCH and DPCCH.

Referring back to FIG. 12, second stage symbol estimates are generated based on second stage equalized symbols in step 1220. Step 1220 is similar to step 920 in one aspect. That is, the process illustrated in FIG. 10 to obtain the first stage symbol estimates can also be performed to obtain the second stage symbol estimates. That is, the demodulator 530 in step 1010 demodulates the second stage equalized symbols to obtain second stage demodulated bit soft values, the decoder 540 in step 1020 decodes the second stage demodulated bit soft values to obtain second stage likelihood indicators, and the soft symbol modulator 720 in step 1030 modulates the second stage likelihood indicators to generate the second stage symbol estimates.

In step 1230, the signal regenerator 550 stores the second stage symbol estimates in the symbol buffer 560. In step 1240, the signal regenerator 550 processes the second stage symbol estimates to obtain a second stage signal estimate in the chip domain. Step 1240 is also similar to step 940. Thus, process illustrated in FIG. 11 can also be used to regenerate the second stage signal estimate. Thus, the details are not described. In step 1245, the signal regenerator 550 stores the second stage signal estimate in the regeneration buffer 575. The same process can be performed for different users. Also, the reader should further note that even across different users, the regenerated signal estimates can be stored as a sum in the regeneration buffer 575 as illustrated in FIG. 8B.

In step 1250, the interference canceller 570 adds back previous versions of the regenerated signal estimates in the chip domain to the second composite signal to undo the cancellation performed in the previous stage. In step 1260, the interference canceller 570 cancels the second stage signal estimates of the different users (as well as the control signal) from the second composite signal (with the undone cancellation) in the chip domain. As a result, a further interference-reduced version of the first composite signal is obtained.

Figure 14:
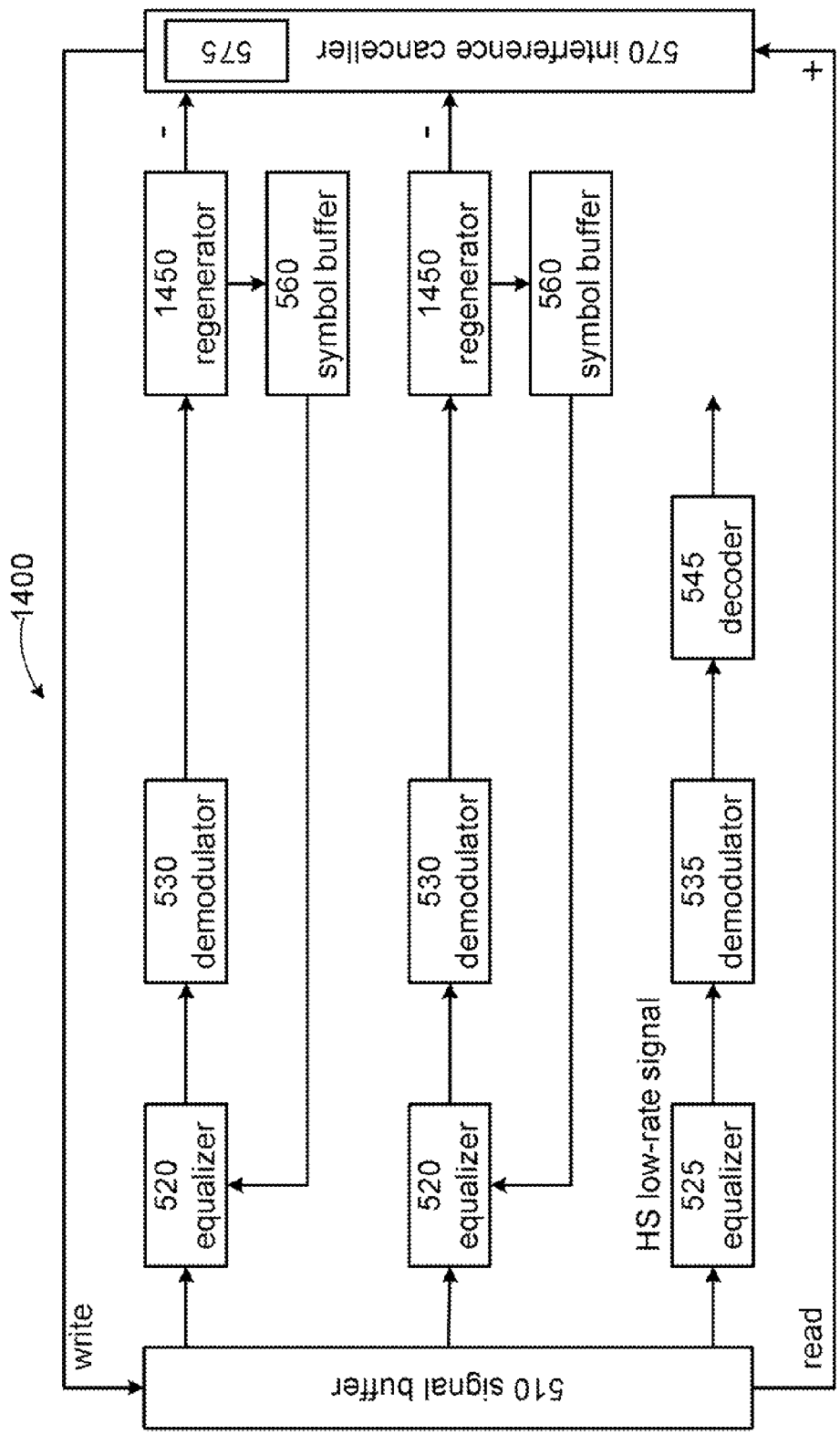
FIG. 14 illustrates another example embodiment of a receiver.

FIG. 10 illustrates an example of soft post-decoding interference cancellation performed by the receiver 500. However, there are other ways to generate current stage symbol estimates. FIG. 14 illustrates an embodiment of a receiver 1400 that performs pre-decoding IC and FIG. 15 illustrates a flow chart of another example process to implement steps 920, 1220 to generate the current stage symbol estimates.

The receiver 1400 comprises components similar or identical to that of the receiver 500 such as the signal buffer 510, equalizers 520, demodulators 530, symbol buffers 560, interference canceller 570 and regeneration buffer 575. The receiver 1400 can perform iterative hard and/or soft pre-decoding interference cancellation based on the output of the demodulator 530. Thus, the decoder 540 need not be included in the receiver 1400 for pre-decoding cancellation.

Example architectures of the signal regenerator 1450 is illustrated in FIG. 16. As seen, the signal regenerator 1450 includes components similar to that of the signal regenerator 550 illustrated in FIG. 7. Thus, the detailed descriptions with regard to the similar components are not repeated. The signal regenerators 550 and 1450 in FIGS. 7 and 16 differ in that the regenerator 1450 includes a modulator 1620 structured to output symbols based on the demodulated bits (in the case of hard pre-decoding interference cancellation) or bit LLRs (in the case of soft pre-decoding interference cancellation) from the demodulator 530.

A flow chart of an example process for current stage (first or second) generating step 920, 1220 to obtain the current stage symbol estimates performed by the receiver 1400 is illustrated in FIG. 15. In step 1510, the demodulator 530 demodulates the current stage equalized symbols to obtain current stage demodulated bits or current stage likelihood indicators. In step 1520, the modulator 1620 (of the signal regenerator 1450) modulates the current stage demodulated bits or the current stage likelihood indicators to generate the current stage symbol estimates. The current stage symbol estimates can be written to the symbol buffer 560.

Note that in FIG. 16, the remaining components of the signal generator 1450—serial-to-parallel converter 730, spreaders 740, adder 750, scrambler 760, and the channel filter 770—are the same as the signal generator 550 illustrated in FIG. 7. Thus, in one aspect, the signal generator 1450 may also perform the process illustrated in FIG. 11 to regenerate the current stage signal estimate in the chip domain.

Figure 17:
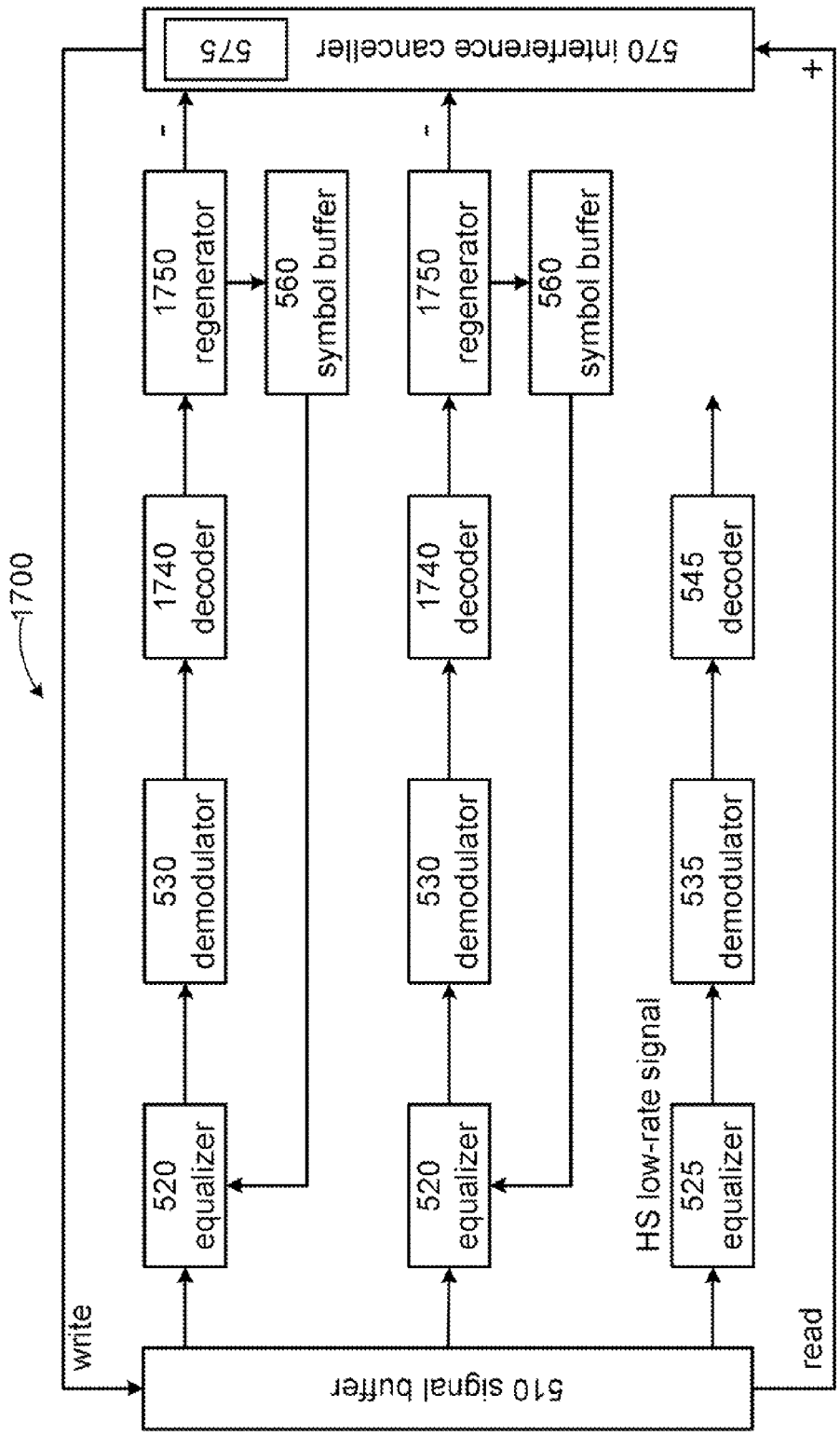
FIG. 17 illustrates yet another example embodiment of a receiver.
Figure 18:
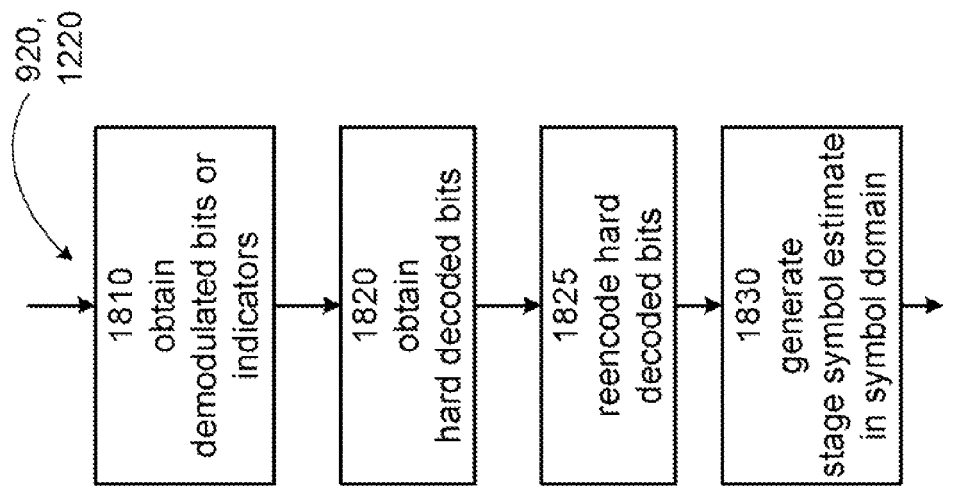
FIG. 18 illustrates a flow chart of yet another example process to generate current stage symbol estimates in a symbol domain.
Figure 19:
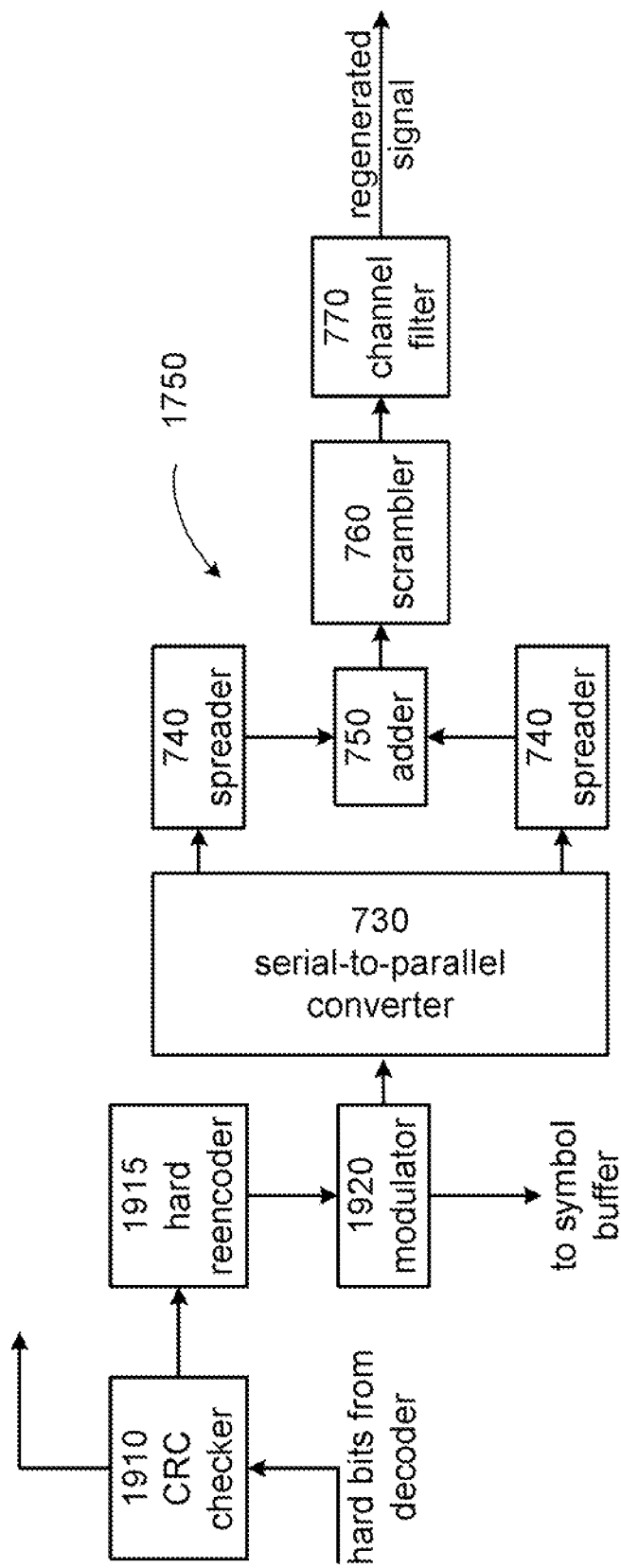
FIG. 19 illustrates yet another example embodiment of a signal regenerator.

FIG. 17 illustrates an embodiment of a receiver 1700 that performs a hard-post decoding IC, and FIG. 19 illustrates a signal regenerator 1750. Again, detailed description of similar components will not be provided. The signal regenerators 550 and 1750 in FIGS. 7 and 18 differ in that the regenerator 1750 includes a CRC checker 1910 structured to check the CRC of the output of the decoder 1740, a hard reencoder 1915 structured to reencode the output of the decoder 1740 to obtain current stage reeincoded bits values, and a modulator 1920 structured to modulate the current stage reencoded bit values to obtain the current stage symbol estimates, which can be written to the symbol buffer 560.

For iterative hard post-decoding multi-layer or multi-user interference cancellation, the regeneration of the signal can be based on hard information bits of the decoder output when the cyclic redundancy check (CRC) passes. FIG. 18 illustrates a flow chart of yet another example process to implement steps 920, 1220 to obtain the current stage symbol estimates. A flow chart of an example process for current stage (first or second) generating step 920, 1220 to obtain the current stage symbol estimates performed by the receiver 1700 is illustrated in FIG. 18. In step 1810, the demodulator 530 demodulates the current stage equalized symbols to obtain current stage demodulated bits or current stage likelihood indicators. In step 1820, the decoder 1740 decodes the current stage demodulated bits or the current stage likelihood indicators to obtain current stage decoded information bit values. When the CRC of the current stage decoded information bit values passes (checked by the CRC checker 1910), the hard reencoder 1915 reencodes the current stage decoded information bit values to obtain current stage reencoded bit values in step 1825. Then in step 1830, the modulator 1920 modulates current stage reencoded bit values to generate the current stage symbol estimates.

Again, once the current stage estimates in the symbol domain are obtained, the signal generator 1750 may also perform the process illustrated in FIG. 11 to regenerate the current stage signal estimate in the chip domain.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed in a receive node of a communication network to perform interference cancellation (IC), the method comprising:
   using IC receiver, performing a first stage processing a symbol of interest contained in a first composite signal, the first composite signal being a signal in a chip domain; and
   using the IC receiver, performing a second stage processing the same symbol of interest contained in a second composite signal, the second composite signal also being a signal in the chip domain,
   wherein the first stage processing comprises:
      first stage despreading and combining the first composite signal in the chip domain to obtain first stage equalized symbols in a symbol domain;
      first stage generating first stage symbol estimates in the symbol domain based on the first stage equalized symbols;
      first stage regenerating a first stage signal estimate in the chip domain based on the first stage symbol estimates; and
      first stage interference canceling the first stage signal estimate from the first composite signal in the chip domain to generate an interference reduced version of the first composite signal, and
   wherein the second stage processing comprises:
      second stage despreading and combining the second composite signal in the chip domain to obtain second stage symbol values in the symbol domain;
      second stage symbol adding-back a scaled version of a previous stage symbol estimates to the second stage symbol values to obtain second stage equalized symbols in the symbol domain; and
      second stage generating second stage symbol estimates in the symbol domain based on the second stage equalized symbols,
   wherein the second composite signal is based on the interference-reduced version of the first composite signal, and
   wherein in the step of second stage generating the second stage symbol estimates, the previous stage symbol estimates are the first stage symbol estimates or the second stage symbol estimates generated in a previous run of the second stage processing.

2. The method of claim 1, wherein the step of second stage symbol adding-back comprises:
   determining a scaling factor;
   scaling the previous stage symbol estimates by the scaling factor to obtain the scaled version of the previous stage symbol estimates; and
   summing the second stage symbol values and the scaled version of the previous stage symbol estimates to obtain the second stage equalized symbols.

3. The method of claim 2, wherein in the step of determining the scaling factor, the scaling factor is based on any one or more of user specific G-Rake or G-Rake+ combining weights of the current second stage processing and user-specific net channel response.

4. The method of claim 3, wherein the G-Rake+ combining weights are code-averaged.

5. The method of claim 3, wherein in the step of determining the scaling factor, the scaling factor is adjusted according to a power difference between E-DPDCH and DPCCH when the net channel response is estimated based on the DPCCH.

6. The method of claim 3, wherein in the step of determining, the scaling factor is adjusted according to a power difference between E-DPDCH and E-DPCCH when the net channel response is estimated based on the E-DPCCH.

7. The method of claim 1, wherein the step of second stage generating the second stage symbol estimates comprises:
   demodulating the second stage equalized symbols to obtain second stage demodulated bit soft values;
   soft decoding the second stage demodulated bit soft values to obtain second stage likelihood indicators; and
   soft modulating the second stage likelihood indicators to generate the second stage symbol estimates.

8. The method of claim 1, wherein the step of second stage generating the second stage symbol estimates comprises:
   demodulating the second stage equalized symbols to obtain second stage demodulated bits or second stage likelihood indicators; and
   modulating the second stage demodulated bits or the second stage likelihood indicators to generate the second stage symbol estimates.

9. The method of claim 1, wherein the step of second stage generating the second stage symbol estimates comprises:
   demodulating the second stage equalized symbols to obtain second stage demodulated bits or second stage likelihood indicators; and
   decoding the second stage demodulated bits or the second stage likelihood indicators obtain second stage decoded information bit values;
   reencoding the second stage decoded information bit values to obtain second stage reencoded bit values; and
   modulating the second stage reencoded bit values to generate the second stage symbol estimates.

10. The method of claim 1, wherein the second stage processing further comprises second stage regenerating a second stage signal estimate in the chip domain based the second stage symbol estimates.

11. The method of claim 10, wherein the step of second stage regenerating the second stage signal estimate comprises:
   spreading the second stage symbol estimates corresponding to one or more channelization codes to obtain corresponding one or more second stage spread signals in the chip domain;
   scrambling the second stage spread signals in the chip domain to obtain a second stage scrambled signal; and
   channel filtering the second stage scrambled signal in the chip domain to obtain the second stage signal estimate.

12. The method of claim 10, wherein the second stage processing further comprises second stage interference canceling the second stage signal estimate from the second composite signal in the chip domain to obtain a further interference reduced version of the first composite signal.

13. The method of claim 1,
   wherein the first stage processing further comprises storing the first stage signal estimate in a regeneration buffer, and
   wherein the first stage processing further comprises storing the second stage signal estimate in the regeneration buffer.

14. The method of claim 13,
wherein in the step of storing the first stage signal estimates, a sum of multiple first stage signal estimates is stored in the regeneration buffer, and
wherein in the step of storing the second stage signal estimates, a sum of multiple second stage signal estimates is stored in the regeneration buffer.

15. The method of claim 1, wherein the first and second composite signals include signals received from multiple receive antennas.

16. The method of claim 1, wherein the first and second composite signals include multiple receive samples per chip.

17. The method of claim 1,
wherein the first stage processing further comprises storing the first stage symbol estimates in a symbol buffer, and
wherein the second stage processing further comprises storing the second stage symbol estimates in the symbol buffer.

18. A receiver of a receive node of a communication network comprising a plurality of chains, each chain structured to process a symbol of interest contained in a first composite signal in a first stage, and to process the same symbol of interest contained in a second composite signal in a second stage, the first and second composite signals both being signals in a chip domain, each chain of the receiver comprising:
an equalizer;
a demodulator;
a signal regenerator; and
an interference canceller,
wherein in the first stage,
the equalizer is structured to first stage despread and combine the first composite signal in the chip domain to obtain first stage equalized symbols in a symbol domain,
the demodulator and the signal regenerator are structured to first stage generate first stage symbol estimates in the symbol domain based on the first stage equalized symbols,
the signal regenerator is structured to first stage regenerate a first stage signal estimate in the chip domain based on the first stage symbol estimates, and
the interference canceller is structured to first stage interference cancel the first stage signal estimate from the first composite signal in the chip domain to generate an interference reduced version of the first composite signal, and
wherein in the second stage,
the equalizer is structured to second stage despread and combine the second composite signal in the chip domain to obtain second stage symbol values in the symbol domain, and to perform a second stage symbol add-back a scaled version of previous stage symbol estimates to the second stage symbol values to obtain second stage equalized symbols in the symbol domain, and
the demodulator and the signal regenerator are structured to second stage generate second stage symbol estimates in the symbol domain based on the second stage symbol estimates,
wherein the second composite signal is based on the interference-reduced version of the first composite signal, and
wherein the previous stage symbol estimates are the first stage symbol estimates or the second stage symbol estimates obtained in a previous run of the second stage.

19. The receiver of claim 18, wherein in the equalizer comprises:
a multiplier structured to scale the previous stage symbol estimates by a scaling factor to obtain the scaled version of the previous stage symbol estimates; and
an adder structured to sum the second stage symbol values and the scaled version of the previous stage symbol estimates to obtain the second stage equalized symbols.

20. The receiver of claim 19, wherein the equalizer is structured to determine the scaling factor based on any one or more of user specific G-Rake or G-Rake+ combining weights of the current second stage processing and user-specific net channel response.

21. The receiver of claim 20, wherein the equalizer is structured to code-average the G-Rake+ combining weights.

22. The receiver of claim 20, wherein the equalizer is structured to adjust the scaling factor according to a power difference between E-DPDCH and DPCCH when the net channel response is estimated based on the DPCCH.

23. The receiver of claim 20, wherein the equalizer is structured to adjust the scaling factor according to a power difference between E-DPDCH and E-DPCCH when the net channel response is estimated based on the E-DPCCH.

24. The receiver of claim 18, further comprising a decoder,
wherein the demodulator is structured to demodulate the second stage equalized symbols to obtain second stage demodulated bit soft values,
wherein the decoder is structured to soft decode the second stage demodulated bit soft values to obtain second stage likelihood indicators, and
wherein the signal generator comprises a modulator is structured to soft modulate the second stage likelihood indicators to generate the second stage symbol estimates.

25. The receiver of claim 18,
wherein the demodulator is structured to demodulate the second stage equalized symbols to obtain second stage demodulated bits or second stage likelihood indicators, and
wherein the signal generator comprises a modulator is structured to soft modulate the second stage demodulated bits or the second stage likelihood indicators to generate the second stage symbol estimates.

26. The receiver of claim 18, further comprising a decoder,
wherein the demodulator is structured to demodulate the second stage equalized symbols to obtain second stage demodulated bits or second stage likelihood indicators,
wherein the decoder is structured to decode the second stage demodulated bits or the second stage likelihood indicators obtain second stage decoded information bit values, and
wherein the signal generator comprises:
a hard reencoder structured to reencode the second stage decoded information bit values to obtain second stage reencoded bit values, and
a modulator structured to modulate the second stage reencoded bit values to generate the second stage symbol estimates.

27. The receiver of claim 18, wherein the signal regenerator is structured to regenerate a second stage signal estimate in the chip domain based the second stage symbol estimates.

28. The receiver of claim 27, wherein the signal regenerator is structured to
spread the second stage symbol estimates corresponding to one or more channelization codes to obtain corresponding one or more second stage spread signals in the chip domain, scramble the second stage spread signals in the chip domain to obtain a second stage scrambled signal; and
channel filter the second stage scrambled signal in the chip domain to regenerate the second stage signal estimate.

29. The receiver of claim 27, wherein the interference canceller is structured cancel the second stage signal estimate from the second composite signal in the chip domain to obtain a further interference reduced version of the first composite signal.

30. The receiver of claim 18, further comprising a symbol buffer, wherein the signal regenerator is structured to
store the first stage symbol estimates in the symbol buffer in the first stage, and
store the second stage symbol estimates in the symbol buffer in the second stage.

31. The receiver of claim 30, wherein the signal regenerator is structured to store a sum of multiple first stage signal estimates in the regeneration buffer, and store a sum of multiple second stage signal estimates in the regeneration buffer.

32. The receiver of claim 18, wherein the first and second composite signals include signals received from multiple receive antennas.

33. The receiver of claim 18, wherein the first and second composite signals include multiple receive samples per chip.

34. The receiver of claim 18, wherein the signal regenerator is structured to store the first stage symbol estimates in a symbol buffer, and store the second stage symbol estimates in the symbol buffer.

35. A non-transitory computer readable medium containing therein a program executable by a computer in a receive node of a communication network, when executed, the program causing the computer to perform an interference cancellation (IC) method, the IC method comprising:
performing a first stage processing a symbol of interest contained in a first composite signal, the first composite signal being a signal in a chip domain; and
performing a second stage processing the same symbol of interest contained in a second composite signal, the second composite signal also being a signal in the chip domain,
wherein the first stage processing comprises:
first stage despreading and combining the first composite signal in the chip domain to obtain first stage equalized symbols in a symbol domain;
first stage generating first stage symbol estimates in the symbol domain based on the first stage equalized symbols;
first stage regenerating a first stage signal estimate in the chip domain based on the first stage symbol estimates; and
first stage interference canceling the first stage signal estimate from the first composite signal in the chip domain to generate an interference reduced version of the first composite signal, and
wherein the second stage processing comprises:
second stage despreading and combining the second composite signal in the chip domain to obtain second stage symbol values in the symbol domain;
second stage symbol adding-back a scaled version of a previous stage symbol estimates to the second stage symbol values to obtain second stage equalized symbols in the symbol domain; and
second stage generating second stage symbol estimates in the symbol domain based on the second stage equalized symbols,
wherein the second composite signal is based on the interference-reduced version of the first composite signal, and
wherein the previous stage symbol estimates are the first stage symbol estimates or the second stage symbol estimates obtained in the step of second stage generating in a previous run of the second stage processing.

* * * * *

UNITED STATES PATENT AND TRADEMARK OFFICE
CERTIFICATE OF CORRECTION

| | | |
|---|---|---|
| PATENT NO. | : 8,681,835 B2 | Page 1 of 1 |
| APPLICATION NO. | : 13/402297 | |
| DATED | : March 25, 2014 | |
| INVENTOR(S) | : Wang et al. | |

It is certified that error appears in the above-identified patent and that said Letters Patent is hereby corrected as shown below:

In the Specification

In Column 10, Line 22, delete "symbols ŝ an MMSE" and insert -- symbol ŝ is an MMSE --, therefor.

Signed and Sealed this
Second Day of September, 2014

Michelle K. Lee
*Deputy Director of the United States Patent and Trademark Office*